United States Patent [19]

Hagersten et al.

[11] Patent Number: 5,958,019
[45] Date of Patent: Sep. 28, 1999

[54] MULTIPROCESSING SYSTEM CONFIGURED TO PERFORM SYNCHRONIZATION OPERATIONS

[75] Inventors: Erik E. Hagersten, Palo ALto, Calif.; Robert C. Zak, Jr., Lexington, Mass.; Shaw-Wen Yang, Concord, Mass.; Aleksandr Guzovskiy, Lowell, Mass.; William A. Nesheim, Windham, N.H.; Monica C. Wong-Chan, Concord; Hien Nguyen, Newton, both of Mass.

[73] Assignee: Sun Microsystems, Inc., Palo Alto, Calif.

[21] Appl. No.: 08/674,328

[22] Filed: Jul. 1, 1996

[51] Int. Cl.[6] .................................................... G06F 13/42
[52] U.S. Cl. .......................... 709/400; 711/141; 711/144; 711/145
[58] Field of Search .................... 395/200.43, 200.31, 395/200.32, 553, 800.13; 711/144, 145, 146, 141

[56] References Cited

U.S. PATENT DOCUMENTS

| | | | |
|---|---|---|---|
| 5,222,229 | 6/1993 | Fukuda et al. | 395/553 |
| 5,428,761 | 6/1995 | Herlihy et al. | 711/130 |
| 5,440,750 | 8/1995 | Kitai et al. | 395/500 |
| 5,481,747 | 1/1996 | Kametani | 395/672 |
| 5,634,071 | 5/1997 | Dewa et al. | 395/800.13 |

FOREIGN PATENT DOCUMENTS 0 345 738 A2  12/1989  European Pat. Off. .

OTHER PUBLICATIONS

Skeppstedt et al., "Simple Compiler Algorithms to Reduce Ownership Overhead in cache Coherence Protocols," ACM Sigplan Notices, vol. 11, Nov. 29, 1994, New York, US, pp. 286–296.

Truman et al., "Evaluating the Memory Overhead Required for COMA Architecture," 21th Annual International Symposium on Computer Architecture, Apr. 18–21, 1994, Chicago, IL, pp. 82–93.

Reihardt et al., "Tempest and Typhoon: User–Level Shared Memory," Computer Architecture News, vol. 22, No. 2, Apr. 1994, New York, European Search Report for Application No. 97304651.9 dated Nov. 13, 1997.

Cox et al., "Adaptive Cache Coherency for Detecting Migratory Shared Data," Proc. 20th Annual Symposium on Computer Architecture, May 1993, pp. 98–108.

(List continued on next page.)

*Primary Examiner*—Dung C. Dinh
*Attorney, Agent, or Firm*—Conley, Rose, & Tayon, PC; B. Noel Kivlin

[57] ABSTRACT

When a processor within a computer system performs a synchronization operation, the system interface within the node delays subsequent transactions from the processor until outstanding coherency activity is completed. Therefore, the computer system may employ asynchronous operations. The synchronization operations may be used when needed to guarantee global completion of one or more prior asynchronous operations. In one embodiment, the synchronization operation is placed into a queue within the system interface. When the synchronization operation reaches the head of the queue, it may be initiated within the system interface. The system interface further includes a request agent comprising multiple control units, each of which may concurrently service coherency activity with respect to a different transaction. Furthermore, the system interface includes a synchronization control vector register which stores a bit for each control unit. Upon initiation of the synchronization operation within the system interface, bits corresponding to those control units which are performing coherency activity (i.e. those which are not idle) are set while other bits are cleared. As each control unit returns to the idle state, the corresponding bit is cleared as well. Once all the bits within the synchronization control vector register are cleared, the coherency activity which was outstanding when the synchronization operation was initiated is complete. The synchronization operation may then be completed.

20 Claims, 17 Drawing Sheets

OTHER PUBLICATIONS

Stenström et al., "An Adaptive Cache Coherence Protocol Optimized for Migratory Sharing," Proc. 20$^{th}$ Annual Symposium on Computer Architecture, May 1993 IEEE, pp. 109–118.

Wolf–Dietrich Weber et al., "Analysis of Cache Invalidation Patterns in Multiprocessors"., Computer Laboratory, Stanford University, CA, pp. 243–256.

Kourosh et al., "Two Techniques to Enhance the Performance of Memory Consistency Models," 1991 International Conference on Parallel Processing, pp. 1–10.

Li et al., "Memory Coherence in Shared Virtual Memory Systems," 1986 ACM, pp. 229–239.

D. Lenosky, PhD, "The Description and Analysis of DASH: A Scalable Directory–Based Multiprocessor," *DASH Prototype System,* Dec. 1991, pp. 36–56.

Hagersten et al., "Simple COMA Node Implementations," Ashley Saulsbury and Anders Landin Swedish Institute of Computer Science, 12 pages.

Saulsbury et al., "An Argument for Simple COMA," Swedish Institute of Computer Science, 10 pages.

Hagersten et al., "Simple COMA," Ashley Saulsbury and Anders Landin Swedish Institute of Computer Science, Jul. 1993, pp. 233–259.

| Request Code | Request Type | Origin |
|---|---|---|
| RTS | Read to Share (COMA) | R |
| RTO | Read to Own (COMA) | R |
| RS | Read Stream (COMA) | R |
| RTSN | Read to Share (NUMA) | R |
| RTON | Read to Own (NUMA) | R |
| RSN | Read Stream (NUMA) | R |
| WB | Write Back | R |
| INV | Invalidate | R |
| WS | Write Stream | R |
| RIO | I/O Read | R |
| RBIO | I/O Block Read | R |
| WIO | I/O Write | R |
| WBIO | I/O Block Write | R |
| FLU | Flush | R |
| INT | Interrupt | R |
| ADM | Administrative | R |

Fig. 9

| Demand Code | Demand Type | Origin |
|---|---|---|
| RTS | Read to Share | H |
| RTO | Read to Own | H |
| RS | Read Stream | H |
| INV | Invalidate | H |
| ADM | Administrative | H |

Fig. 10

| Reply Code | Reply Type | Origin |
|---|---|---|
| D | Data | S, H |
| ACK | Acknowledge | S, H |
| SNO | Slave Not Owned | S |
| ANM | Address Not Mapped | S |
| ERR | Error | S |
| NACK | Not Acknowledge | H |
| NOPE | Negative Response | H |

| Completion Code | Completion Type | Origin |
|---|---|---|
| CMP | Completion | R |
| CMP_D | Completion with Data 1 | R |
| CMP_W | Completion with Data 2 | R |
| CMP_S | Completion - Failed | R |

| Trans | Mtag | Req. | D | D' | D-O | D-S | R-H | R-OS | R-SS | Comp |
|---|---|---|---|---|---|---|---|---|---|---|
| RTS | i | RTS | m,o,s | - | - | - | ACK | - | - | CMP |
| RTS | i | RTS | i | s | RTS | - | - | D | - | CMP |
| RTS | n | RTSN | m,o | - | RTS | - | - | D | - | CMP |
| RTS | n | RTSN | s,i | s | RTS | - | - | D | - | CMP |
| RTO | o,s,i | RTO | m | - | - | - | ACK | - | - | CMP |
| RTO | o,s,i | RTO | o,s | m | INV | INV | - | ACK | ACK | CMP |
| RTO | o,s,i | RTO | i | m | RTO | INV | - | D | ACK | CMP |
| RTO | n | RTON | any | m | RTO | INV | - | D | ACK | CMP |
| RS | i | RS | m,o,s | - | - | - | ACK | - | - | CMP |
| RS | i | RS | i | - | RS | - | - | D | - | CMP |
| RS | n | RSN | any | - | RS | - | - | D | - | CMP |
| WS | o,s,i | INV | any | m | INV | INV | - | ACK | ACK | CMP |
| WS | n | WS | any | i | INV | INV | - | ACK | ACK | CMP_W |
| WB | n | WB | m,o | s | - | - | ACK | - | - | CMP_W |
| WB | n | WB | s,i | - | - | - | NACK | - | - | CMP |
| INT | - | INT | - | - | - | - | ACK | - | - | CMP_D |
| INT | - | INT | - | - | - | - | NACK | - | - | CMP |
| RIO | - | RIO | - | - | - | - | ANM | - | - | CMP |
| RIO | - | RIO | - | - | - | - | D | - | - | CMP |
| RBIO | - | RBIO | - | - | - | - | ANM | - | - | CMP |
| RBIO | - | RBIO | - | - | - | - | D | - | - | CMP |
| WIO | - | WIO | - | - | - | - | ACK | - | - | CMP_D |
| WBIO | - | WBIO | - | - | - | - | ACK | - | - | CMP_D |
| ADM | - | ADM | - | - | - | ADM | - | - | ACK | CMP |

Fig. 13

MULTIPROCESSING SYSTEM CONFIGURED TO PERFORM SYNCHRONIZATION OPERATIONS

BACKGROUND OF THE INVENTION

1. Field of the Invention

This invention relates to the field of multiprocessor computer systems and, more particularly, to synchronization operations within multiprocessor computer systems.

2. Description of the Relevant Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

Another structure for multiprocessing computer systems is a distributed shared memory architecture. A distributed shared memory architecture includes multiple nodes within which processors and memory reside. The multiple nodes communicate via a network coupled there between. When considered as a whole, the memory included within the multiple nodes forms the shared memory for the computer system. Typically, directories are used to identify which nodes have cached copies of data corresponding to a particular address. Coherency activities may be generated via examination of the directories.

Distributed shared memory systems are scaleable, overcoming the limitations of the shared bus architecture. Since many of the processor accesses are completed within a node, nodes typically have much lower bandwidth requirements upon the network than a shared bus architecture must provide upon its shared bus. The nodes may operate at high clock frequency and bandwidth, accessing the network when needed. Additional nodes may be added to the network without affecting the local bandwidth of the nodes. Instead, only the network bandwidth is affected.

The distributed shared memory architecture is typically characterized by rapid access to memory within the local node with the memory accessor (e.g. a processor) and substantially slower access to memory within a remote node. Unfortunately, the performance of a processor accessing memory in a remote node may degrade due to the slower access to that memory. Often, the processor may stall awaiting completion of the slower access. In order to alleviate the performance degradation whenever possible, computer systems often define asynchronous operations. Asynchronous operations are operations which, at some point during their performance but prior to their completion, release the processor which initiated them. The processor may continue forward with additional operations while the remainder of the computer system completes the asynchronous operation. In particular, asynchronous operations often release the processor prior to the operation being "globally performed" (i.e. prior to completion of coherency activities initiated in response to the asynchronous operation).

For example, a write operation may be performed in an asynchronous manner by transferring the data to be written from the processor prior to performing coherency activity to obtain write permission to the affected coherency unit. The write has not been completed, but the processor may continue with other operations since the data has been transferred therefrom. Performance is increased by releasing the processor resources consumed by the write operation earlier than would otherwise be possible.

It is sometimes necessary for a program executing upon a processor to determine that an asynchronous operation previously initiated by the processor has completed. For example, a series of asynchronous write operations may be followed by setting a flag indicating that the series has been completed. Prior to setting the flag, the program may need to verify that the series has completed (or at least has been globally performed). A mechanism for performing synchronization in a distributed shared memory computer system is therefore needed.

SUMMARY OF THE INVENTION

The problems outlined above are in large part solved by a computer system employing a synchronization operation in accordance with the present invention. When a processor within the computer system performs a synchronization operation, the system interface within the node delays subsequent transactions from the processor until outstanding coherency activity is completed. Advantageously, the computer system may employ asynchronous operations. The synchronization operations may be used when needed to guarantee global completion of one or more prior asynchronous operations.

In one embodiment, the synchronization operation is placed into a queue within a system interface. When the synchronization operation reaches the head of the queue, it may be initiated within the system interface. The system interface further includes a request agent comprising multiple control units, each of which may concurrently service coherency activity with respect to a different transaction. Furthermore, the system interface includes a synchronization control vector register which stores a bit for each control unit. Upon initiation of the synchronization operation within the system interface, bits corresponding to those control units which are performing coherency activity (i.e. those which are not idle) are set while other bits are cleared. As each control unit returns to the idle state, the corresponding bit is cleared as well. Once all the bits within the synchronization control vector register are cleared, the coherency activity which was outstanding when the synchronization operation was initiated is complete. The synchronization operation may then be completed, as well as any transactions subsequent to the synchronization operation from the processor which initiated the synchronization operation.

Broadly speaking, the present invention contemplates a processing node comprising a processor and a request agent. The processor is configured to perform a synchronization command. Coupled to receive the synchronization command from the processor, the request agent is configured to perform a synchronization operation upon receipt of the synchronization command.

The present invention further contemplates a method for performing synchronization. A synchronization operation is executed in a processor within a processing node. The synchronization operation is received in a request agent within the processing node. Coherency activity initiated by the request agent prior to receiving the synchronization operation is completed. Subsequently, the synchronization operation is reissued within the processing node, whereby the synchronization operation is completed.

The present invention still further contemplates a method for synchronizing. At least one asynchronous operation is executed. A system level synchronizing operation is executed subsequent to the asynchronous operation. A processor level synchronization operation is then executed subsequent to the system level synchronization operation.

The present invention additionally contemplates a computer system comprising a first processing node and a second processing node. The first processing node includes a request agent and at least one processor. The request agent is configured to perform coherency requests in response to transactions performed by the processor. The second processing node includes a slave agent configured to perform coherency replies in response to the coherency requests. Additionally, the request agent is configured to inhibit additional coherency requests in response to transactions performed by the processor until the coherency replies are received for coherency requests outstanding from the request agent upon receipt of a synchronization operation performed within the first processing node.

BRIEF DESCRIPTION OF THE DRAWINGS

Other objects and advantages of the invention will become apparent upon reading the following detailed description and upon reference to the accompanying drawings in which:

FIG. 9 is a table listing request types according to one embodiment of the system interface.

FIG. 10 is a table listing demand types according to one embodiment of the system interface.

FIG. 11 is a table listing reply types according to one embodiment of the system interface.

FIG. 12 is a table listing completion types according to one embodiment of the system interface.

FIG. 13 is a table describing coherency operations in response to various operations performed by a processor, according to one embodiment of the system interface.

Figure 1:
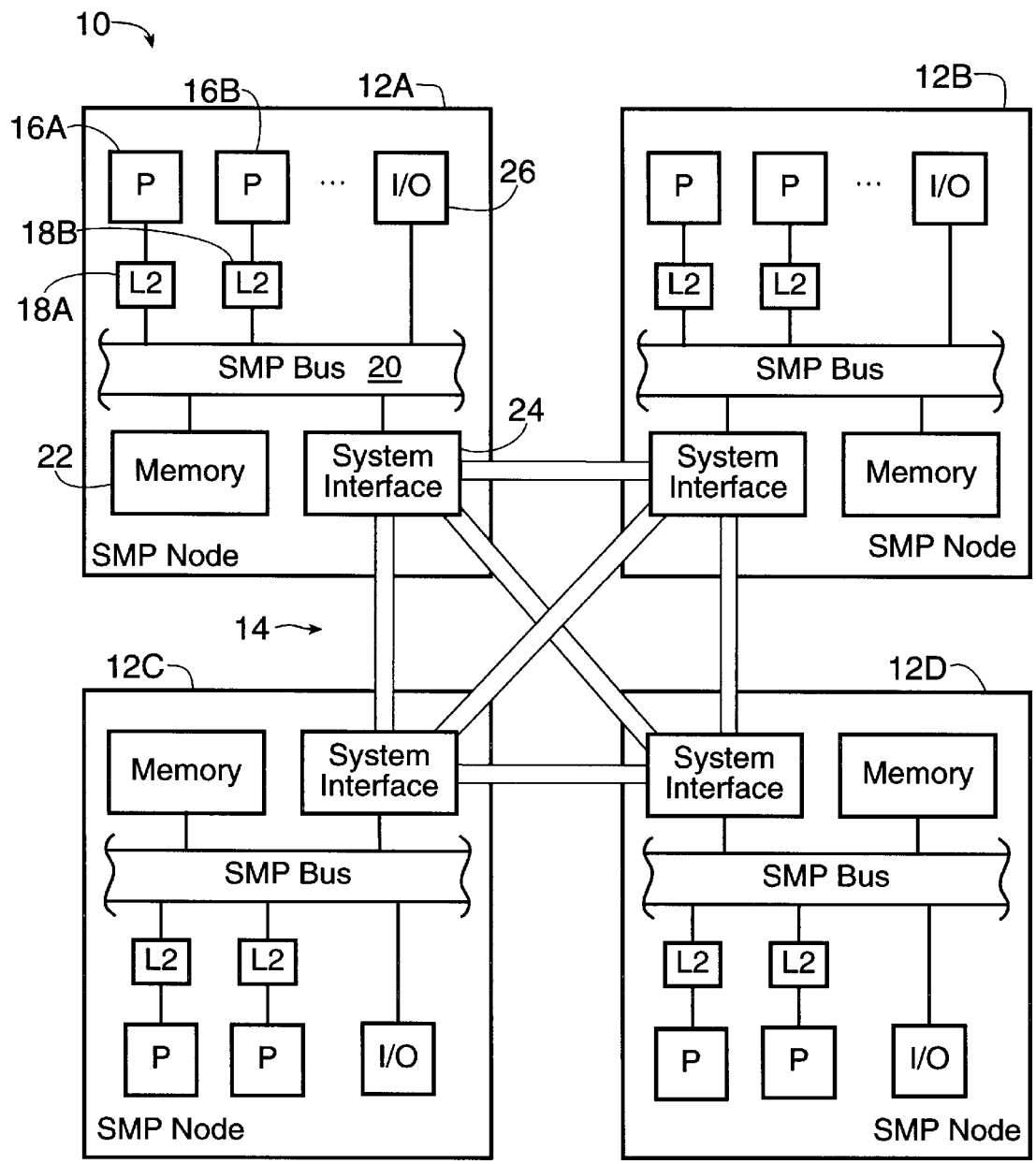
FIG. 1 is a block diagram of a multiprocessor computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a multiprocessing computer system 10 is shown. Computer system 10 includes multiple SMP nodes 12A–12D interconnected by a point-to-point network 14. Elements referred to herein with a particular reference number followed by a letter will be collectively referred to by the reference number alone. For example, SMP nodes 12A–12D will be collectively referred to as SMP nodes 12. In the embodiment shown, each SMP node 12 includes multiple processors, external caches, an SMP bus, a memory, and a system interface. For example, SMP node 12A is configured with multiple processors including processors 16A–16B. The processors 16 are connected to external caches 18, which are further coupled to an SMP bus 20. Additionally, a memory 22 and a system interface 24 are coupled to SMP bus 20. Still further, one or more input/output (I/O) interfaces 26 may be coupled to SMP bus 20. I/O interfaces 26 are used to interface to peripheral devices such as serial and parallel ports, disk drives, modems, printers, etc. Other SMP nodes 12B–12D may be configured similarly.

Generally speaking, computer system 10 is configured to perform synchronization operations initiated by a processor 16. The synchronization operation is broadcast as a command having a specific encoding upon SMP bus 20, and is received by system interface 24. System interface 24 internally initiates the synchronization when other transactions from the initiating processor performed prior to the synchronization operation have been initiated. Upon internal initiation of the synchronization operation, system interface 24 notes any previously initiated requests. When each of the previously initiated requests have completed (i.e. have been globally performed), the synchronization operation is reissued upon SMP bus 20 and completes. Advantageously, transactions issued by the processor 16 performing the synchronization operation are completed prior to reissue of the synchronization operation. The processor 16 is thereby informed that the transactions (including any asynchronous transactions) initiated prior to the synchronization operation have completed.

In one embodiment, the synchronization operation comprises a specially coded write stream transaction. The special coding is contained within the most significant bits of the address presented by the processor 16 for the write stream transaction. The write transaction is placed into a queue within system interface 24, and is initiated internally by system interface 24 when the write transaction reaches the head of the queue. Transactions are removed from the queue in the order that they are presented upon SMP bus 20, and therefore the transactions presented prior to the write transaction have been initiated when the write transaction arrives at the head of the queue. Additionally, system interface 24 may comprise multiple independent control units for initiating and completing coherency activity. Each control unit may be concurrently performing coherency activities in response to different transactions from SMP bus 20. System interface 24 notes those control units which are active (i.e. not idle) when the synchronization operation is internally initiated. As each control unit returns to the idle state, it is removed from the list of control units which must return to idle prior to completing the synchronization operation. Subsequent to each of the noted control units returning to idle, the synchronization operation may be reissued upon SMP bus 20. The synchronization is thereby completed.

As used herein, the term synchronization operation refers to an operation which confirms the completion of previously initiated operations (including asynchronous operations).

It is noted that the embodiment described above synchronizes all transactions initiated prior to the synchronization operation, not just those transactions emanating from the initiating processor. In this manner, a processor 16 may perform a synchronization operation on behalf of transactions performed by another processor within the node. Programs taking advantage of such functionality may pass messages between the processors to determine when the synchronization is to occur.

Generally speaking, a memory operation is an operation causing transfer of data from a source to a destination. The source and/or destination may be storage locations within the initiator, or may be storage locations within memory. When a source or destination is a storage location within memory, the source or destination is specified via an address conveyed with the memory operation. Memory operations may be read or write operations. A read operation causes transfer of data from a source outside of the initiator to a destination within the initiator. Conversely, a write operation causes transfer of data from a source within the initiator to a destination outside of the initiator. In the computer system shown in FIG. 1, a memory operation may include one or more transactions upon SMP bus 20 as well as one or more coherency operations upon network 14.

Architectural Overview

Each SMP node 12 is essentially an SMP system having memory 22 as the shared memory. Processors 16 are high performance processors. In one embodiment, each processor 16 is a SPARC processor compliant with version 9 of the SPARC processor architecture. It is noted, however, that any processor architecture may be employed by processors 16.

Typically, processors 16 include internal instruction and data caches. Therefore, external caches 18 are labeled as L2 caches (for level 2, wherein the internal caches are level 1 caches) If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. External caches 18 provide rapid access to memory addresses frequently accessed by the processor 16 coupled thereto. It is noted that external caches 18 may be configured in any of a variety of specific cache arrangements. For example, set-associative or direct-mapped configurations may be employed by external caches 18.

SMP bus 20 accommodates communication between processors 16 (through caches 18), memory 22, system interface 24, and I/O interface 26. In one embodiment, SMP bus 20 includes an address bus and related control signals, as well as a data bus and related control signals. Because the address and data buses are separate, a split-transaction bus protocol may be employed upon SMP bus 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

Memory 22 is configured to store data and instruction code for use by processors 16. Memory 22 preferably comprises dynamic random access memory (DRAM), although any type of memory may be used. Memory 22, in conjunction with similar illustrated memories in the other SMP nodes 12, forms a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between SMP nodes 12 as well as among processors 16 and caches 18 within a particular SMP node 12A–12D. System interface 24 provides internode coherency, while snooping upon SMP bus 20 provides intranode coherency.

In addition to maintaining internode coherency, system interface 24 detects addresses upon SMP bus 20 which require a data transfer to or from another SMP node 12. System interface 24 performs the transfer, and provides the corresponding data for the transaction upon SMP bus 20. In the embodiment shown, system interface 24 is coupled to a point-to-point network 14. However, it is noted that in alternative embodiments other networks may be used. In a point-to-point network, individual connections exist between each node upon the network. A particular node communicates directly with a second node via a dedicated link. To communicate with a third node, the particular node utilizes a different link than the one used to communicate with the second node.

It is noted that, although four SMP nodes 12 are shown in FIG. 1, embodiments of computer system 10 employing any number of nodes are contemplated.

Figure 1A:
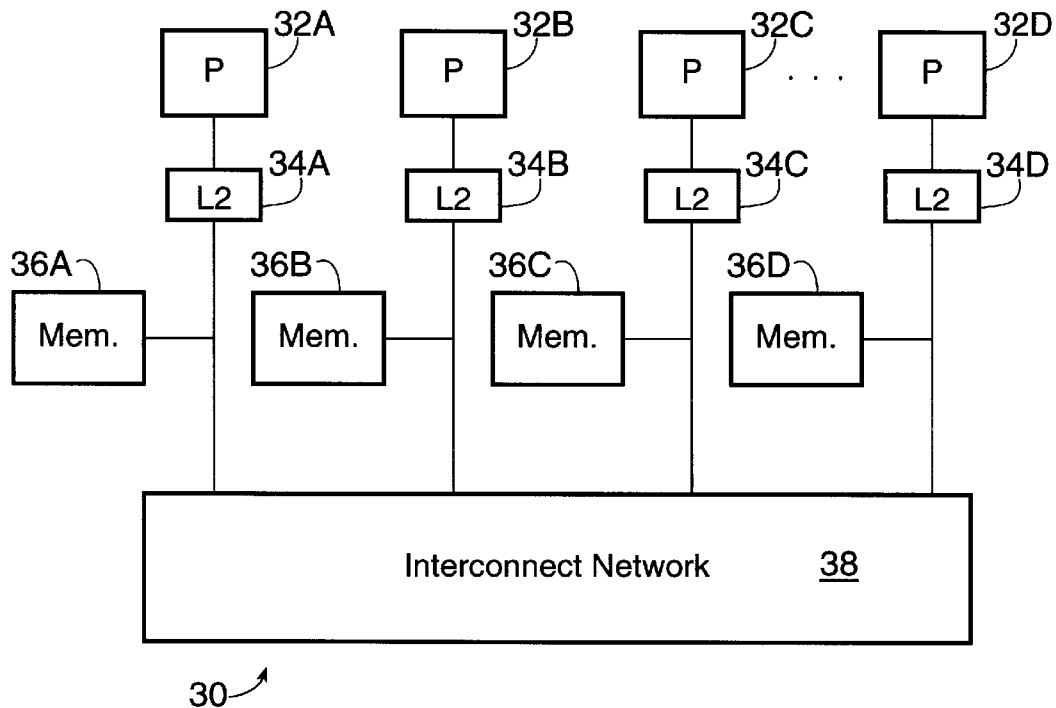
FIG. 1A is a conceptualized block diagram depicting a non-uniform memory architecture supported by one embodiment of the computer system shown in FIG. 1.
Figure 1B:
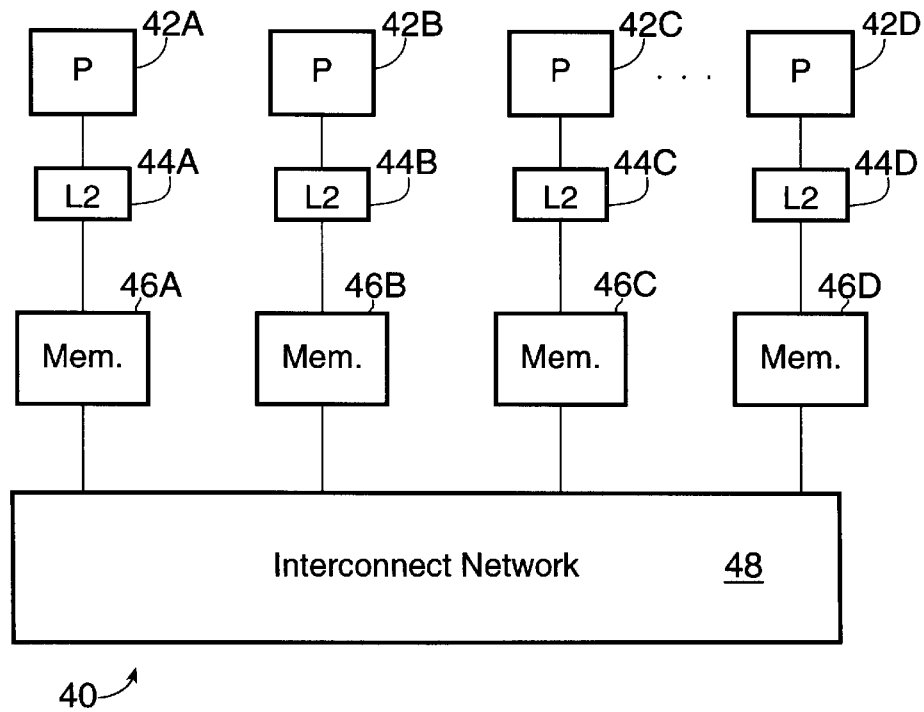
FIG. 1B is a conceptualized block diagram depicting a cache-only memory architecture supported by one embodiment of the computer system shown in FIG. 1.

FIGS. 1A and 1B are conceptualized illustrations of distributed memory architectures supported by one embodiment of computer system 10. Specifically, FIGS. 1A and 1B illustrate alternative ways in which each SMP node 12 of FIG. 1 may cache data and perform memory accesses. Details regarding the manner in which computer system 10 supports such accesses will be described in further detail below.

Turning now to FIG. 1A, a logical diagram depicting a first memory architecture 30 supported by one embodiment of computer system 10 is shown. Architecture 30 includes multiple processors 32A–32D, multiple caches 34A–34D, multiple memories 36A–36D, and an interconnect network 38. The multiple memories 36 form a distributed shared memory. Each address within the address space corresponds to a location within one of memories 36.

Architecture 30 is a non-uniform memory architecture (NUMA). In a NUMA architecture, the amount of time required to access a first memory address may be substantially different than the amount of time required to access a second memory address. The access time depends upon the origin of the access and the location of the memory 36A–36D which stores the accessed data. For example, if processor 32A accesses a first memory address stored in memory 36A, the access time may be significantly shorter than the access time for an access to a second memory address stored in one of memories 36B–36D. That is, an access by processor 32A to memory 36A may be completed locally (e.g. without transfers upon network 38), while a processor 32A access to memory 36B is performed via network 38. Typically, an access through network 38 is slower than an access completed within a local memory. For example, a local access might be completed in a few hundred nanoseconds while an access via the network might occupy a few microseconds.

Data corresponding to addresses stored in remote nodes may be cached in any of the caches 34. However, once a cache 34 discards the data corresponding to such a remote address, a subsequent access to the remote address is completed via a transfer upon network 38.

NUMA architectures may provide excellent performance characteristics for software applications which use addresses that correspond primarily to a particular local memory. Software applications which exhibit more random access patterns and which do not confine their memory accesses to addresses within a particular local memory, on the other hand, may experience a large amount of network traffic as a particular processor 32 performs repeated accesses to remote nodes.

Turning now to FIG. 1B, a logic diagram depicting a second memory architecture 40 supported by the computer system 10 of FIG. 1 is shown. Architecture 40 includes multiple processors 42A–42D, multiple caches 44A–44D, multiple memories 46A–46D, and network 48. However, memories 46 are logically coupled between caches 44 and network 48. Memories 46 serve as larger caches (e.g. a level 3 cache), storing addresses which are accessed by the corresponding processors 42. Memories 46 are said to "attract" the data being operated upon by a corresponding processor 42. As opposed to the NUMA architecture shown in FIG. 1A, architecture 40 reduces the number of accesses upon the network 48 by storing remote data in the local memory when the local processor accesses that data.

Architecture 40 is referred to as a cache-only memory architecture (COMA). Multiple locations within the distributed shared memory formed by the combination of memories 46 may store data corresponding to a particular address. No permanent mapping of a particular address to a particular storage location is assigned. Instead, the location storing data corresponding to the particular address changes dynamically based upon the processors 42 which access that particular address. Conversely, in the NUMA architecture a particular storage location within memories 46 is assigned to a particular address. Architecture 40 adjusts to the memory access patterns performed by applications executing thereon, and coherency is maintained between the memories 46.

In a preferred embodiment, computer system 10 supports both of the memory architectures shown in FIGS. 1A and 1B. In particular, a memory address may be accessed in a NUMA fashion from one SMP node 12A–12D while being accessed in a COMA manner from another SMP node 12A–12D. In one embodiment, a NUMA access is detected if certain bits of the address upon SMP bus 20 identify another SMP node 12 as the home node of the address presented. Otherwise, a COMA access is presumed. Additional details will be provided below.

In one embodiment, the COMA architecture is implemented using a combination of hardware and software techniques. Hardware maintains coherency between the locally cached copies of pages, and software (e.g. the operating system employed in computer system 10) is responsible for allocating and deallocating cached pages.

Figure 2:
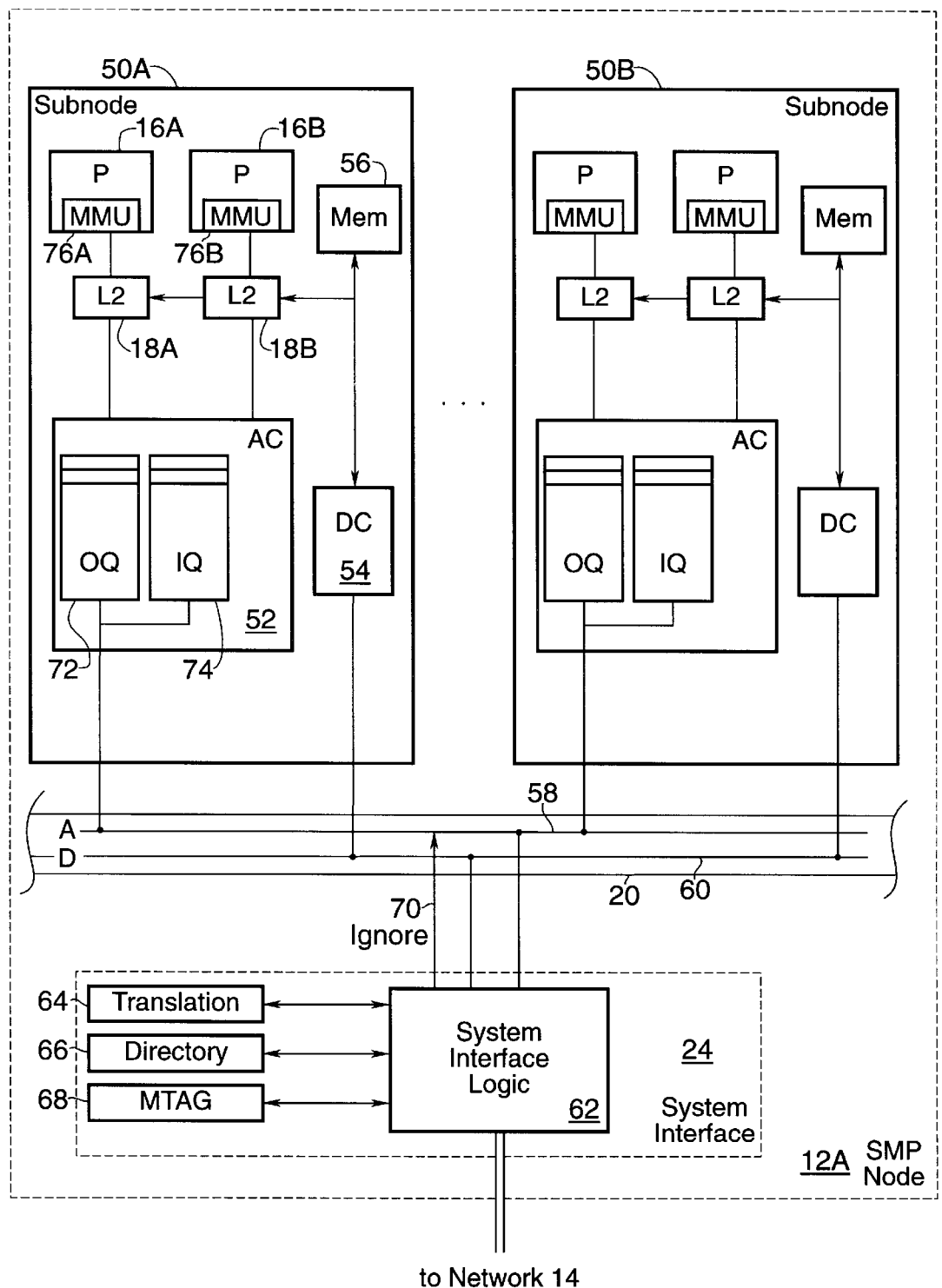
FIG. 2 is a block diagram of one embodiment of a symmetric multiprocessing node depicted in FIG. 1.

FIG. 2 depicts details of one implementation of an SMP node 12A that generally conforms to the SMP node 12A shown in FIG. 1. Other nodes 12 may be configured similarly. It is noted that alternative specific implementations of each SMP node 12 of FIG. 1 are also possible. The implementation of SMP node 12A shown in FIG. 2 includes multiple subnodes such as subnodes 50A and 50B. Each subnode 50 includes two processors 16 and corresponding caches 18, a memory portion 56, an address controller 52, and a data controller 54. The memory portions 56 within subnodes 50 collectively form the memory 22 of the SMP node 12A of FIG. 1. Other subnodes (not shown) are further coupled to SMP bus 20 to form the I/O interfaces 26.

As shown in FIG. 2, SMP bus 20 includes an address bus 58 and a data bus 60. Address controller 52 is coupled to address bus 58, and data controller 54 is coupled to data bus 60. FIG. 2 also illustrates system interface 24, including a system interface logic block 62, a translation storage 64, a directory 66, and a memory tag (MTAG) 68. Logic block 62 is coupled to both address bus 58 and data bus 60, and asserts an ignore signal 70 upon address bus 58 under certain circumstances as will be explained further below. Additionally, logic block 62 is coupled to translation storage 64, directory 66, MTAG 68, and network 14.

For the embodiment of FIG. 2, each subnode 50 is configured upon a printed circuit board which may be inserted into a backplane upon which SMP bus 20 is situated. In this manner, the number of processors and/or I/O interfaces 26 included within an SMP node 12 may be varied by inserting or removing subnodes 50. For example, computer system 10 may initially be configured with a small number of subnodes 50. Additional subnodes 50 may be added from time to time as the computing power required by the users of computer system 10 grows.

Address controller 52 provides an interface between caches 18 and the address portion of SMP bus 20. In the embodiment shown, address controller 52 includes an out queue 72 and some number of in queues 74. Out queue 72 buffers transactions from the processors connected thereto until address controller 52 is granted access to address bus 58. Address controller 52 performs the transactions stored in out queue 72 in the order those transactions were placed into out queue 72 (i.e. out queue 72 is a FIFO queue). Transactions performed by address controller 52 as well as transactions received from address bus 58 which are to be snooped by caches 18 and caches internal to processors 16 are placed into in queue 74.

Similar to out queue 72, in queue 74 is a FIFO queue. All address transactions are stored in the in queue 74 of each subnode 50 (even within the in queue 74 of the subnode 50 which initiates the address transaction). Address transactions are thus presented to caches 18 and processors 16 for snooping in the order they occur upon address bus 58. The order that transactions occur upon address bus 58 is the order for SMP node 12A. However, the complete system is expected to have one global memory order. This ordering expectation creates a problem in both the NUMA and COMA architectures employed by computer system 10, since the global order may need to be established by the order of operations upon network 14. If two nodes perform a transaction to an address, the order that the corresponding coherency operations occur at the home node for the address defines the order of the two transactions as seen within each node. For example, if two write transactions are performed to the same address, then the second write operation to arrive at the address' home node should be the second write transaction to complete (i.e. a byte location which is updated by both write transactions stores a value provided by the second write transaction upon completion of both transactions). However, the node which performs the second transaction may actually have the second transaction occur first upon SMP bus 20. Ignore signal 70 allows the second transaction to be transferred to system interface 24 without the remainder of the SMP node 12 reacting to the transaction.

Therefore, in order to operate effectively with the ordering constraints imposed by the out queue/in queue structure of address controller 52, system interface logic block 62 employs ignore signal 70. When a transaction is presented upon address bus 58 and system interface logic block 62 detects that a remote transaction is to be performed in response to the transaction, logic block 62 asserts the ignore signal 70. Assertion of the ignore signal 70 with respect to a transaction causes address controller 52 to inhibit storage of the transaction into in queues 74. Therefore, other transactions which may occur subsequent to the ignored transaction and which complete locally within SMP node 12A may complete out of order with respect to the ignored transaction without violating the ordering rules of in queue 74. In particular, transactions performed by system interface 24 in response to coherency activity upon network 14 may be performed and completed subsequent to the ignored transaction. When a response is received from the remote transaction, the ignored transaction may be reissued by system interface logic block 62 upon address bus 58. The transaction is thereby placed into in queue 74, and may complete in order with transactions occurring at the time of reissue.

It is noted that in one embodiment, once a transaction from a particular address controller 52 has been ignored, subsequent coherent transactions from that particular address controller 52 are also ignored. Transactions from a particular processor 16 may have an important ordering relationship with respect to each other, independent of the ordering requirements imposed by presentation upon address bus 58. For example, a transaction may be separated from another transaction by a memory synchronizing instruction such as the MEMBAR instruction included in the SPARC architecture. The processor 16 conveys the transactions in the order the transactions are to be performed with respect to each other. The transactions are ordered within out queue 72, and therefore the transactions originating from a particular out queue 72 are to be performed in order. Ignoring subsequent transactions from a particular address controller 52 allows the in-order rules for a particular out queue 72 to be preserved. It is further noted that not all transactions from a particular processor must be ordered. However, it is difficult to determine upon address bus 58 which transactions must be ordered and which transactions may not be ordered. Therefore, in this implementation, logic block 62 maintains the order of all transactions from a particular out queue 72. It is noted that other implementations of subnode 50 are possible that allow exceptions to this rule.

Data controller 54 routes data to and from data bus 60, memory portion 56 and caches 18. Data controller 54 may include in and out queues similar to address controller 52. In one embodiment, data controller 54 employs multiple physical units in a byte-sliced bus configuration.

Processors 16 as shown in FIG. 2 include memory management units (MMUs) 76A–76B. MMUs 76 perform a virtual to physical address translation upon the data addresses generated by the instruction code executed upon processors 16, as well as the instruction addresses. The addresses generated in response to instruction execution are virtual addresses. In other words, the virtual addresses are the addresses created by the programmer of the instruction code. The virtual addresses are passed through an address translation mechanism (embodied in MMUs 76), from which corresponding physical addresses are created. The physical address identifies a storage location within memory 22.

Address translation is performed for many reasons. For example, the address translation mechanism may be used to grant or deny a particular computing task's access to certain memory addresses. In this manner, the data and instructions within one computing task are isolated from the data and instructions of another computing task. Additionally, portions of the data and instructions of a computing task may be "paged out" to a hard disk drive. When a portion is paged out, the translation is invalidated. Upon access to the portion by the computing task, an interrupt occurs due to the failed translation. The interrupt allows the operating system to retrieve the corresponding information from the hard disk drive. In this manner, more virtual memory may be available than actual memory in memory 22. Many other uses for virtual memory are well known.

Referring back to the computer system 10 shown in FIG. 1 in conjunction with the SMP node 12A implementation illustrated in FIG. 2, the physical address computed by MMUs 76 is a local physical address (LPA) defining a location within the memory 22 associated with the SMP node 12 in which the processor 16 is located. MTAG 68 stores a coherency state for each "coherency unit" in memory 22. When an address transaction is performed upon SMP bus 20, system interface logic block 62 examines the coherency state stored in MTAG 68 for the accessed coherency unit. If the coherency state indicates that the SMP node 12 has sufficient access rights to the coherency unit to perform the access, then the address transaction proceeds. If, however, the coherency state indicates that coherency activity should be performed prior to completion of the transaction, then system interface logic block 62 asserts the ignore signal 70. Logic block 62 performs coherency operations upon network 14 to acquire the appropriate coherency state. When the appropriate coherency state is acquired, logic block 62 reissues the ignored transaction upon SMP bus 20. Subsequently, the transaction completes.

Generally speaking, the coherency state maintained for a coherency unit at a particular storage location (e.g. a cache or a memory 22) indicates the access rights to the coherency unit at that SMP node 12. The access right indicates the validity of the coherency unit, as well as the read/write permission granted for the copy of the coherency unit within that SMP node 12. In one embodiment, the coherency states employed by computer system 10 are modified, owned, shared, and invalid. The modified state indicates that the SMP node 12 has updated the corresponding coherency unit. Therefore, other SMP nodes 12 do not have a copy of the coherency unit. Additionally, when the modified coherency unit is discarded by the SMP node 12, the coherency unit is stored back to the home node. The owned state indicates that the SMP node 12 is responsible for the coherency unit, but other SMP nodes 12 may have shared copies. Again, when the coherency unit is discarded by the SMP node 12, the coherency unit is stored back to the home node. The shared state indicates that the SMP node 12 may read the coherency unit but may not update the coherency unit without acquiring the owned state. Additionally, other SMP nodes 12 may have copies of the coherency unit as well. Finally, the invalid state indicates that the SMP node 12 does not have a copy of the coherency unit. In one embodiment, the modified state indicates write permission and any state but invalid indicates read permission to the corresponding coherency unit.

As used herein, a coherency unit is a number of contiguous bytes of memory which are treated as a unit for coherency purposes. For example, if one byte within the coherency unit is updated, the entire coherency unit is considered to be updated. In one specific embodiment, the coherency unit is a cache line, comprising 64 contiguous bytes. It is understood, however, that a coherency unit may comprise any number of bytes.

System interface 24 also includes a translation mechanism which utilizes translation storage 64 to store translations from the local physical address to a global address (GA). Certain bits within the global address identify the home node for the address, at which coherency information is stored for that global address. For example, an embodiment of computer system 10 may employ four SMP nodes 12 such as that of FIG. 1. In such an embodiment, two bits of the global address identify the home node. Preferably, bits from the most significant portion of the global address are used to identify the home node. The same bits are used in the local physical address to identify NUMA accesses. If the bits of the LPA indicate that the local node is not the home node, then the LPA is a global address and the transaction is performed in NUMA mode. Therefore, the operating system places global addresses in MMUs 76 for any NUMA-type pages. Conversely, the operating system places LPAs in MMU 76 for any COMA-type pages. It is noted that an LPA may equal a GA (for NUMA accesses as well as for global addresses whose home is within the memory 22 in the node in which the LPA is presented). Alternatively, an LPA may be translated to a GA when the LPA identifies storage locations used for storing copies of data having a home in another SMP node 12.

The directory 66 of a particular home node identifies which SMP nodes 12 have copies of data corresponding to a given global address assigned to the home node such that coherency between the copies may be maintained. Additionally, the directory 66 of the home node identifies the SMP node 12 which owns the coherency unit. Therefore, while local coherency between caches 18 and processors 16 is maintained via snooping, system-wide (or global) coherency is maintained using MTAG 68 and directory 66. Directory 66 stores the coherency information corresponding to the coherency units which are assigned to SMP node 12A (i.e. for which SMP node 12A is the home node).

It is noted that for the embodiment of FIG. 2, directory 66 and MTAG 68 store information for each coherency unit (i.e., on a coherency unit basis). Conversely, translation storage 64 stores local physical to global address translations defined for pages. A page includes multiple coherency units, and is typically several kilobytes or even megabytes in size.

Software accordingly creates local physical address to global address translations on a page basis (thereby allocating a local memory page for storing a copy of a remotely stored global page). Therefore, blocks of memory 22 are allocated to a particular global address on a page basis as well. However, as stated above, coherency states and coherency activities are performed upon a coherency unit. Therefore, when a page is allocated in memory to a particular global address, the data corresponding to the page is not necessarily transferred to the allocated memory. Instead, as processors 16 access various coherency units within the page, those coherency units are transferred from the owner of the coherency unit. In this manner, the data actually accessed by SMP node 12A is transferred into the corresponding memory 22. Data not accessed by SMP node 12A may not be transferred, thereby reducing overall bandwidth usage upon network 14 in comparison to embodiments which transfer the page of data upon allocation of the page in memory 22.

It is noted that in one embodiment, translation storage 64, directory 66, and/or MTAG 68 may be caches which store only a portion of the associated translation, directory, and MTAG information, respectively. The entirety of the translation, directory, and MTAG information is stored in tables within memory 22 or a dedicated memory storage (not shown). If required information for an access is not found in the corresponding cache, the tables are accessed by system interface 24.

Figure 2A:
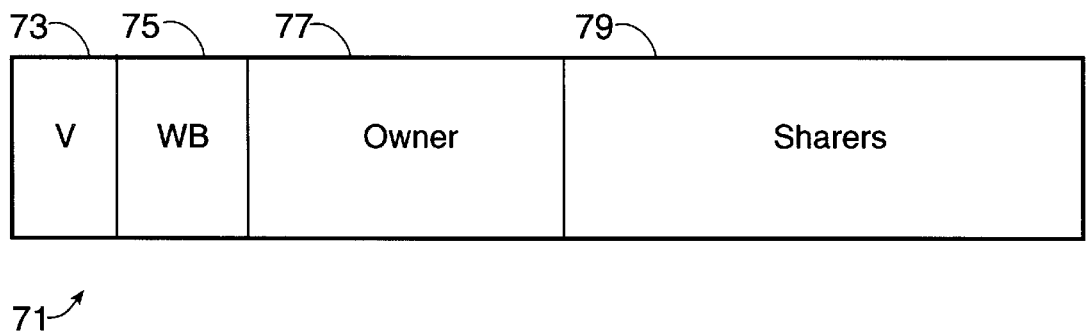
FIG. 2A is an exemplary directory entry stored in one embodiment of a directory depicted in FIG. 2.

Turning now to FIG. 2A, an exemplary directory entry 71 is shown. Directory entry 71 may be employed by one embodiment of directory 66 shown in FIG. 2. Other embodiments of directory 66 may employ dissimilar directory entries. Directory entry 71 includes a valid bit 73, a write back bit 75, an owner field 77, and a sharers field 79. Directory entry 71 resides within the table of directory entries, and is located within the table via the global address identifying the corresponding coherency unit. More particularly, the directory entry 71 associated with a coherency unit is stored within the table of directory entries at an offset formed from the global address which identifies the coherency unit.

Valid bit 73 indicates, when set, that directory entry 71 is valid (i.e. that directory entry 71 is storing coherency information for a corresponding coherency unit). When clear, valid bit 73 indicates that directory entry 71 is invalid.

Owner field 77 identifies one of SMP nodes 12 as the owner of the coherency unit. The owning SMP node 12A–12D maintains the coherency unit in either the modified or owned states. Typically, the owning SMP node 12A–12D acquires the coherency unit in the modified state (see FIG. 13 below). Subsequently, the owning SMP node 12A–12D may then transition to the owned state upon providing a copy of the coherency unit to another SMP node 12A–12D. The other SMP node 12A–12D acquires the coherency unit in the shared state. In one embodiment, owner field 77 comprises two bits encoded to identify one of four SMP nodes 12A–12D as the owner of the coherency unit.

Sharers field 79 includes one bit assigned to each SMP node 12A–12D. If an SMP node 12A–12D is maintaining a shared copy of the coherency unit, the corresponding bit within sharers field 79 is set. Conversely, if the SMP node 12A–12D is not maintaining a shared copy of the coherency unit, the corresponding bit within sharers field 79 is clear. In this manner, sharers field 79 indicates all of the shared copies of the coherency unit which exist within the computer system 10 of FIG. 1.

Write back bit 75 indicates, when set, that the SMP node 12A–12D identified as the owner of the coherency unit via owner field 77 has written the updated copy of the coherency unit to the home SMP node 12. When clear, bit 75 indicates that the owning SMP node 12A–12D has not written the updated copy of the coherency unit to the home SMP node 12A–12D.

Figure 3:
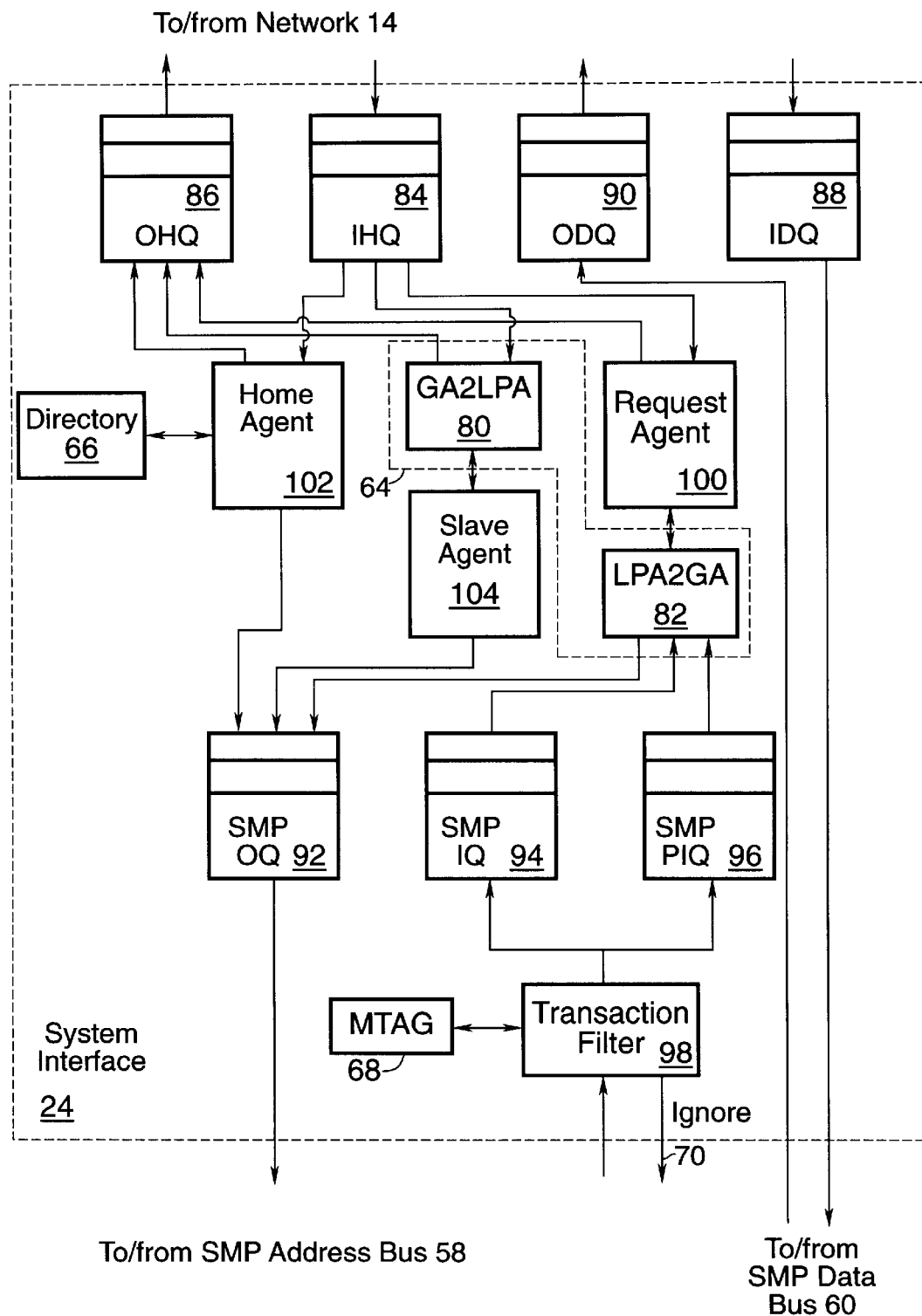
FIG. 3 is a block diagram of one embodiment of a system interface shown in FIG. 1.

Turning now to FIG. 3, a block diagram of one embodiment of system interface 24 is shown. As shown in FIG. 3, system interface 24 includes directory 66, translation storage 64, and MTAG 68. Translation storage 64 is shown as a global address to local physical address (GA2LPA) translation unit 80 and a local physical address to global address (LPA2GA) translation unit 82.

System interface 24 also includes input and output queues for storing transactions to be performed upon SMP bus 20 or network 14. Specifically, for the embodiment shown, system interface 24 includes input header queue 84 and output header queue 86 for buffering header packets to and from network 14. Header packets identify an operation to be performed, and specify the number and format of any data packets which may follow. Output header queue 86 buffers header packets to be transmitted upon network 14, and input header queue 84 buffers header packets received from network 14 until system interface 24 processes the received header packets. Similarly, data packets are buffered in input data queue 88 and output data queue 90 until the data may be transferred upon SMP data bus 60 and network 14, respectively.

SMP out queue 92, SMP in queue 94, and SMP I/O in queue (PIQ) 96 are used to buffer address transactions to and from address bus 58. SMP out queue 92 buffers transactions to be presented by system interface 24 upon address bus 58. Reissue transactions queued in response to the completion of coherency activity with respect to an ignored transaction are buffered in SMP out queue 92. Additionally, transactions generated in response to coherency activity received from network 14 are buffered in SMP out queue 92. SMP in queue 94 stores coherency related transactions to be serviced by system interface 24. Conversely, SMP PIQ 96 stores I/O transactions to be conveyed to an I/O interface residing in another SMP node 12. I/O transactions generally are considered non-coherent and therefore do not generate coherency activities.

SMP in queue 94 and SMP PIQ 96 receive transactions to be queued from a transaction filter 98. Transaction filter 98 is coupled to MTAG 68 and SMP address bus 58. If transaction filter 98 detects an I/O transaction upon address bus 58 which identifies an I/O interface upon another SMP node 12, transaction filter 98 places the transaction into SMP PIQ 96. If a coherent transaction to an LPA address is detected by transaction filter 98, then the corresponding coherency state from MTAG 68 is examined. In accordance with the coherency state, transaction filter 98 may assert ignore signal 70 and may queue a coherency transaction in SMP in queue 94. Ignore signal 70 is asserted and a coherency transaction queued if MTAG 68 indicates that insufficient access rights to the coherency unit for performing the coherent transaction is maintained by SMP node 12A. Conversely, ignore signal 70 is deasserted and a coherency transaction is not generated if MTAG 68 indicates that a sufficient access right is maintained by SMP node 12A.

Transactions from SMP in queue 94 and SMP PIQ 96 are processed by a request agent 100 within system interface 24. Prior to action by request agent 100, LPA2GA translation unit 82 translates the address of the transaction (if it is an LPA address) from the local physical address presented upon SMP address bus 58 into the corresponding global address. Request agent 100 then generates a header packet specifying a particular coherency request to be transmitted to the home node identified by the global address. The coherency request is placed into output header queue 86. Subsequently, a coherency reply is received into input header queue 84. Request agent 100 processes the coherency replies from input header queue 84, potentially generating reissue transactions for SMP out queue 92 (as described below).

Also included in system interface 24 is a home agent 102 and a slave agent 104. Home agent 102 processes coherency requests received from input header queue 84. From the coherency information stored in directory 66 with respect to a particular global address, home agent 102 determines if a coherency demand is to be transmitted to one or more slave agents in other SMP nodes 12. In one embodiment, home agent 102 blocks the coherency information corresponding to the affected coherency unit. In other words, subsequent requests involving the coherency unit are not performed until the coherency activity corresponding to the coherency request is completed. According to one embodiment, home agent 102 receives a coherency completion from the request agent which initiated the coherency request (via input header queue 84). The coherency completion indicates that the coherency activity has completed. Upon receipt of the coherency completion, home agent 102 removes the block upon the coherency information corresponding to the affected coherency unit. It is noted that, since the coherency information is blocked until completion of the coherency activity, home agent 102 may update the coherency information in accordance with the coherency activity performed immediately when the coherency request is received. In one particular embodiment, home agent 102 does not block a coherency unit for a read to share NUMA request if another read to share NUMA request is outstanding for the coherency unit.

Slave agent 104 receives coherency demands from home agents of other SMP nodes 12 via input header queue 84. In response to a particular coherency demand, slave agent 104 may queue a coherency transaction in SMP out queue 92. In one embodiment, the coherency transaction may cause caches 18 and caches internal to processors 16 to invalidate the affected coherency unit. If the coherency unit is modified in the caches, the modified data is transferred to system interface 24. Alternatively, the coherency transaction may cause caches 18 and caches internal to processors 16 to change the coherency state of the coherency unit to shared. Once slave agent 104 has completed activity in response to a coherency demand, slave agent 104 transmits a coherency reply to the request agent which initiated the coherency request corresponding to the coherency demand. The coherency reply is queued in output header queue 86. Prior to performing activities in response to a coherency demand, the global address received with the coherency demand is translated to a local physical address via GA2LPA translation unit 80.

According to one embodiment, the coherency protocol enforced by request agents 100, home agents 102, and slave agents 104 includes a write invalidate policy. In other words, when a processor 16 within an SMP node 12 updates a coherency unit, any copies of the coherency unit stored within other SMP nodes 12 are invalidated. However, other write policies may be used in other embodiments. For example, a write update policy may be employed. According to a write update policy, when an coherency unit is updated the updated data is transmitted to each of the copies of the coherency unit stored in each of the SMP nodes 12.

Figure 4:
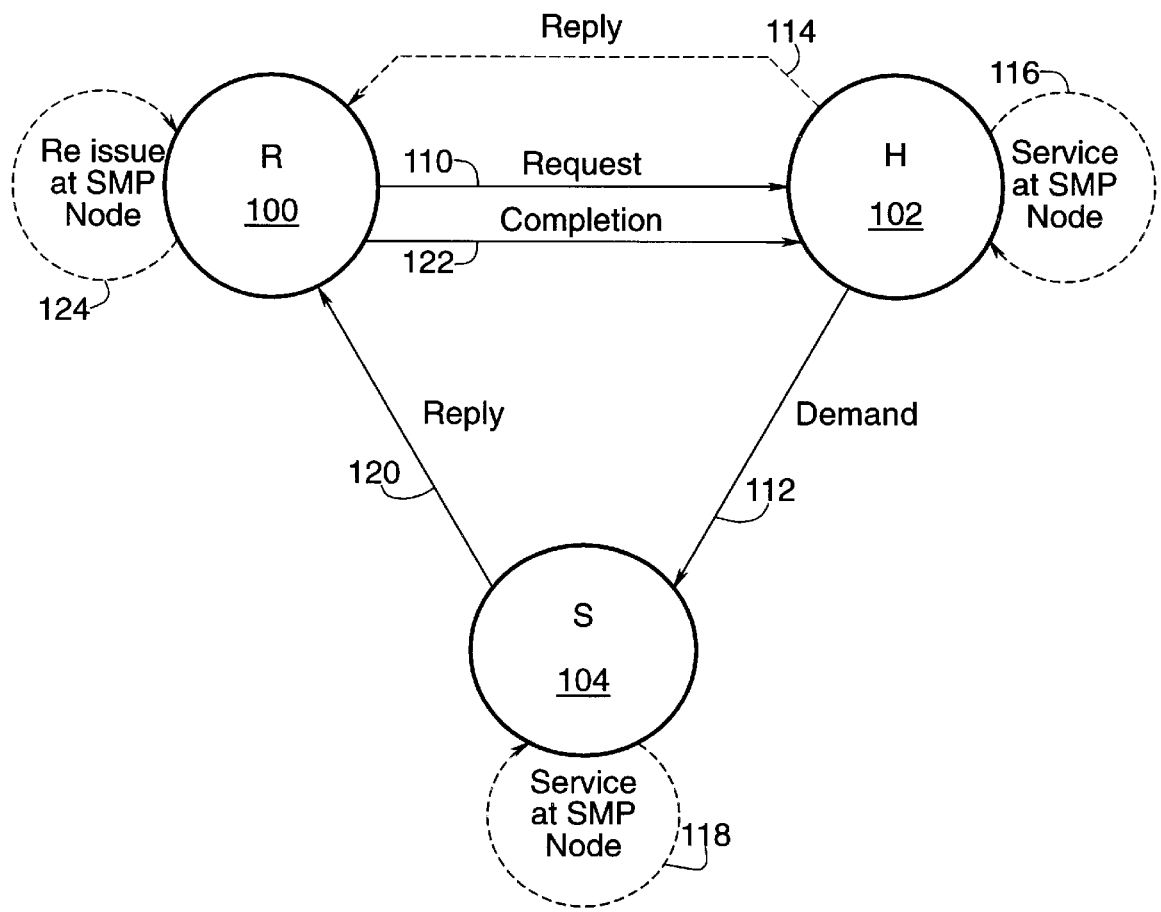
FIG. 4 is a diagram depicting activities performed in response to a typical coherency operation between a request agent, a home agent, and a slave agent.

Turning next to FIG. 4, a diagram depicting typical coherency activity performed between the request agent 100 of a first SMP node 12A–12D (the "requesting node"), the home agent 102 of a second SMP node 12A–12D (the "home node"), and the slave agent 104 of a third SMP node 12A–12D (the "slave node") in response to a particular transaction upon the SMP bus 20 within the SMP node 12 corresponding to request agent 100 is shown. Specific coherency activities employed according to one embodiment of computer system 10 as shown in FIG. 1 are further described below with respect to FIGS. 9–13. Reference numbers 100, 102, and 104 are used to identify request agents, home agents, and slave agents throughout the remainder of this description. It is understood that, when an agent communicates with another agent, the two agents often reside in different SMP nodes 12A–12D.

Upon receipt of a transaction from SMP bus 20, request agent 100 forms a coherency request appropriate for the transaction and transmits the coherency request to the home node corresponding to the address of the transaction (reference number 110). The coherency request indicates the access right requested by request agent 100, as well as the global address of the affected coherency unit. The access right requested is sufficient for allowing occurrence of the transaction being attempted in the SMP node 12 corresponding to request agent 100.

Upon receipt of the coherency request, home agent 102 accesses the associated directory 66 and determines which SMP nodes 12 are storing copies of the affected coherency unit. Additionally, home agent 102 determines the owner of the coherency unit. Home agent 102 may generate a coherency demand to the slave agents 104 of each of the nodes storing copies of the affected coherency unit, as well as to the slave agent 104 of the node which has the owned coherency state for the affected coherency unit (reference number 112). The coherency demands indicate the new coherency state for the affected coherency unit in the receiving SMP nodes 12. While the coherency request is outstanding, home agent 102 blocks the coherency information corresponding to the affected coherency unit such that subsequent coherency requests involving the affected coherency unit are not initiated by the home agent 102. Home agent 102 additionally updates the coherency information to reflect completion of the coherency request.

Home agent 102 may additionally transmit a coherency reply to request agent 100 (reference number 114). The coherency reply may indicate the number of coherency replies which are forthcoming from slave agents 104. Alternatively, certain transactions may be completed without interaction with slave agents 104. For example, an I/O transaction targeting an I/O interface 26 in the SMP node 12 containing home agent 102 may be completed by home agent 102. Home agent 102 may queue a transaction for the associated SMP bus 20 (reference number 116), and then transmit a reply indicating that the transaction is complete.

A slave agent 104, in response to a coherency demand from home agent 102, may queue a transaction for presentation upon the associated SMP bus 20 (reference number 118). Additionally, slave agents 104 transmit a coherency reply to request agent 100 (reference number 120). The coherency reply indicates that the coherency demand received in response to a particular coherency request has been completed by that slave. The coherency reply is transmitted by slave agents 104 when the coherency demand has been completed, or at such time prior to completion of the coherency demand at which the coherency demand is guaranteed to be completed upon the corresponding SMP node 12 and at which no state changes to the affected coherency unit will be performed prior to completion of the coherency demand.

When request agent 100 has received a coherency reply from each of the affected slave agents 104, request agent 100 transmits a coherency completion to home agent 102 (reference number 122). Upon receipt of the coherency completion, home agent 102 removes the block from the corresponding coherency information. Request agent 100 may queue a reissue transaction for performance upon SMP bus 20 to complete the transaction within the SMP node 12 (reference number 124).

It is noted that each coherency request is assigned a unique tag by the request agent 100 which issues the coherency request. Subsequent coherency demands, coherency replies, and coherency completions include the tag. In this manner, coherency activity regarding a particular coherency request may be identified by each of the involved agents. It is further noted that non-coherent operations may be performed in response to non-coherent transactions (e.g. I/O transactions). Non-coherent operations may involve only the requesting node and the home node. Still further, a different unique tag may be assigned to each coherency request by the home agent 102. The different tag identifies the home agent 102, and is used for the coherency completion in lieu of the requestor tag.

Figure 5:
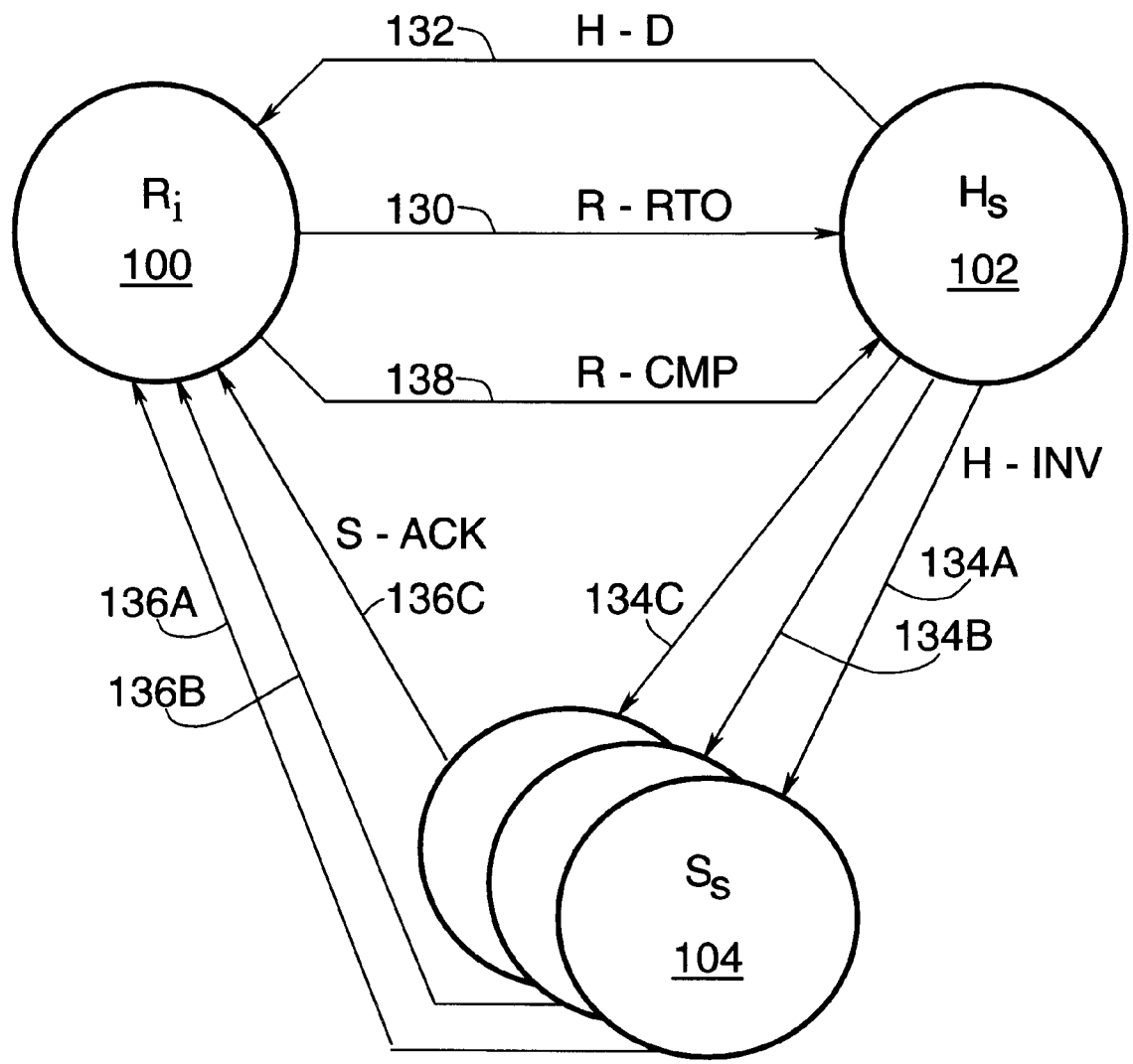
FIG. 5 is an exemplary coherency operation performed in response to a read to own request from a processor.

Turning now to FIG. 5, a diagram depicting coherency activity for an exemplary embodiment of computer system 10 in response to a read to own transaction upon SMP bus 20 is shown. A read to own transaction is performed when a cache miss is detected for a particular datum requested by a processor 16 and the processor 16 requests write permission to the coherency unit. A store cache miss may generate a read to own transaction, for example.

A request agent 100, home agent 102, and several slave agents 104 are shown in FIG. 5. The node receiving the read to own transaction from SMP bus 20 stores the affected coherency unit in the invalid state (e.g. the coherency unit is not stored in the node). The subscript "i" in request node 100 indicates the invalid state. The home node stores the coherency unit in the shared state, and nodes corresponding to several slave agents 104 store the coherency unit in the shared state as well. The subscript "s" in home agent 102 and slave agents 104 is indicative of the shared state at those nodes. The read to own operation causes transfer of the requested coherency unit to the requesting node. The requesting node receives the coherency unit in the modified state.

Upon receipt of the read to own transaction from SMP bus 20, request agent 100 transmits a read to own coherency request to the home node of the coherency unit (reference number 130). The home agent 102 in the receiving home node detects the shared state for one or more other nodes. Since the slave agents are each in the shared state, not the owned state, the home node may supply the requested data directly. Home agent 102 transmits a data coherency reply to request agent 100, including the data corresponding to the requested coherency unit (reference number 132). Additionally, the data coherency reply indicates the number of acknowledgments which are to be received from slave agents of other nodes prior to request agent 100 taking ownership of the data. Home agent 102 updates directory 66 to indicate that the requesting SMP node 12A–12D is the owner of the coherency unit, and that each of the other SMP nodes 12A–12D is invalid. When the coherency information regarding the coherency unit is unblocked upon receipt of a coherency completion from request agent 100, directory 66 matches the state of the coherency unit at each SMP node 12.

Home agent 102 transmits invalidate coherency demands to each of the slave agents 104 which are maintaining shared copies of the affected coherency unit (reference numbers 134A, 134B, and 134C). The invalidate coherency demand causes the receiving slave agent to invalidate the corresponding coherency unit within the node, and to send an acknowledge coherency reply to the requesting node indicating completion of the invalidation. Each slave agent 104 completes invalidation of the coherency unit and subsequently transmits an acknowledge coherency reply (reference numbers 136A, 136B, and 136C). In one embodiment, each of the acknowledge replies includes a count of the total number of replies to be received by request agent 100 with respect to the coherency unit.

Subsequent to receiving each of the acknowledge coherency replies from slave agents 104 and the data coherency reply from home agent 102, request agent 100 transmits a coherency completion to home agent 102 (reference number 138). Request agent 100 validates the coherency unit within its local memory, and home agent 102 releases the block upon the corresponding coherency information. It is noted that data coherency reply 132 and acknowledge coherency replies 136 may be received in any order depending upon the number of outstanding transactions within each node, among other things.

Figure 6:
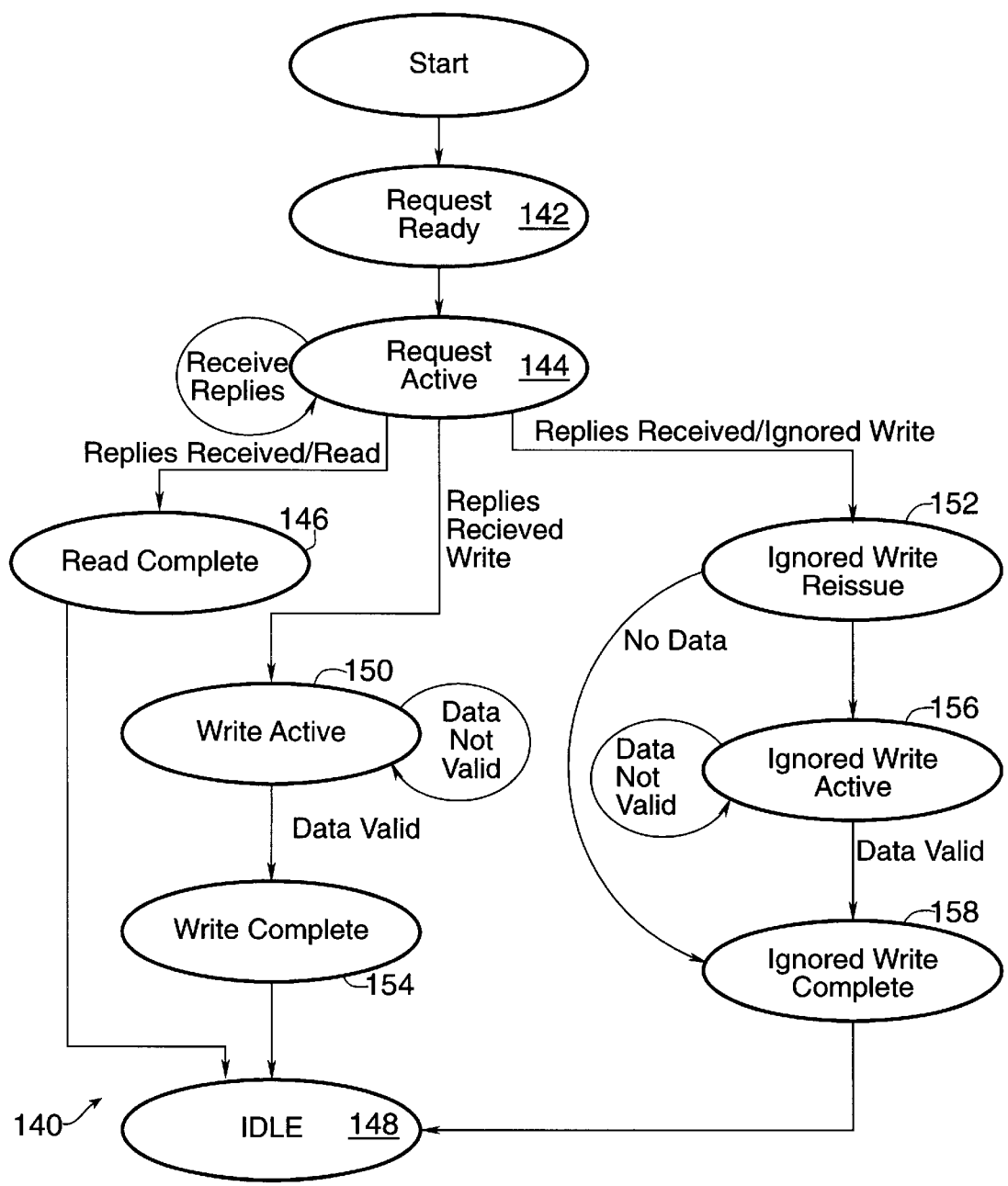
FIG. 6 is a flowchart depicting an exemplary state machine for one embodiment of a request agent shown in FIG. 3.

Turning now to FIG. 6, a flowchart 140 depicting an exemplary state machine for use by request agents 100 is shown. Request agents 100 may include multiple independent copies of the state machine represented by flowchart 140, such that multiple requests may be concurrently processed.

Upon receipt of a transaction from SMP in queue 94, request agent 100 enters a request ready state 142. In request ready state 142, request agent 100 transmits a coherency request to the home agent 102 residing in the home node identified by the global address of the affected coherency unit. Upon transmission of the coherency request, request agent 100 transitions to a request active state 144. During request active state 144, request agent 100 receives coherency replies from slave agents 104 (and optionally from home agent 102). When each of the coherency replies has been received, request agent 100 transitions to a new state depending upon the type of transaction which initiated the coherency activity. Additionally, request active state 142 may employ a timer for detecting that coherency replies have not be received within a predefined time-out period. If the timer expires prior to the receipt of the number of replies specified by home agent 102, then request agent 100 transitions to an error state (not shown). Still further, certain embodiments may employ a reply indicating that a read transfer failed. If such a reply is received, request agent 100 transitions to request ready state 142 to reattempt the read.

If replies are received without error or time-out, then the state transitioned to by request agent 100 for read transactions is read complete state 146. It is noted that, for read transactions, one of the received replies may include the data corresponding to the requested coherency unit. Request agent 100 reissues the read transaction upon SMP bus 20 and further transmits the coherency completion to home agent 102. Subsequently, request agent 100 transitions to an idle state 148. A new transaction may then be serviced by request agent 100 using the state machine depicted in FIG. 6.

Conversely, write active state 150 and ignored write reissue state 152 are used for write transactions. Ignore signal 70 is not asserted for certain write transactions in computer system 10, even when coherency activity is initiated upon network 14. For example, I/O write transactions are not ignored. The write data is transferred to system interface 24, and is stored therein. Write active state 150 is employed for non-ignored write transactions, to allow for transfer of data to system interface 24 if the coherency replies are received prior to the data phase of the write transaction upon SMP bus 20. Once the corresponding data has been received, request agent 100 transitions to write complete state 154. During write complete state 154, the coherency completion reply is transmitted to home agent 102. Subsequently, request agent 100 transitions to idle state 148.

Ignored write transactions are handled via a transition to ignored write reissue state 152. During ignored write reissue state 152, request agent 100 reissues the ignored write transaction upon SMP bus 20. In this manner, the write data may be transferred from the originating processor 16 and the corresponding write transaction released by processor 16. Depending upon whether or not the write data is to be transmitted with the coherency completion, request agent 100 transitions to either the ignored write active state 156 or the ignored write complete state 158. Ignored write active state 156, similar to write active state 150, is used to await data transfer from SMP bus 20. During ignored write complete state 158, the coherency completion is transmitted to home agent 102. Subsequently, request agent 100 transitions to idle state 148. From idle state 148, request agent 100 transitions to request ready state 142 upon receipt of a transaction from SMP in queue 94.

Figure 7:
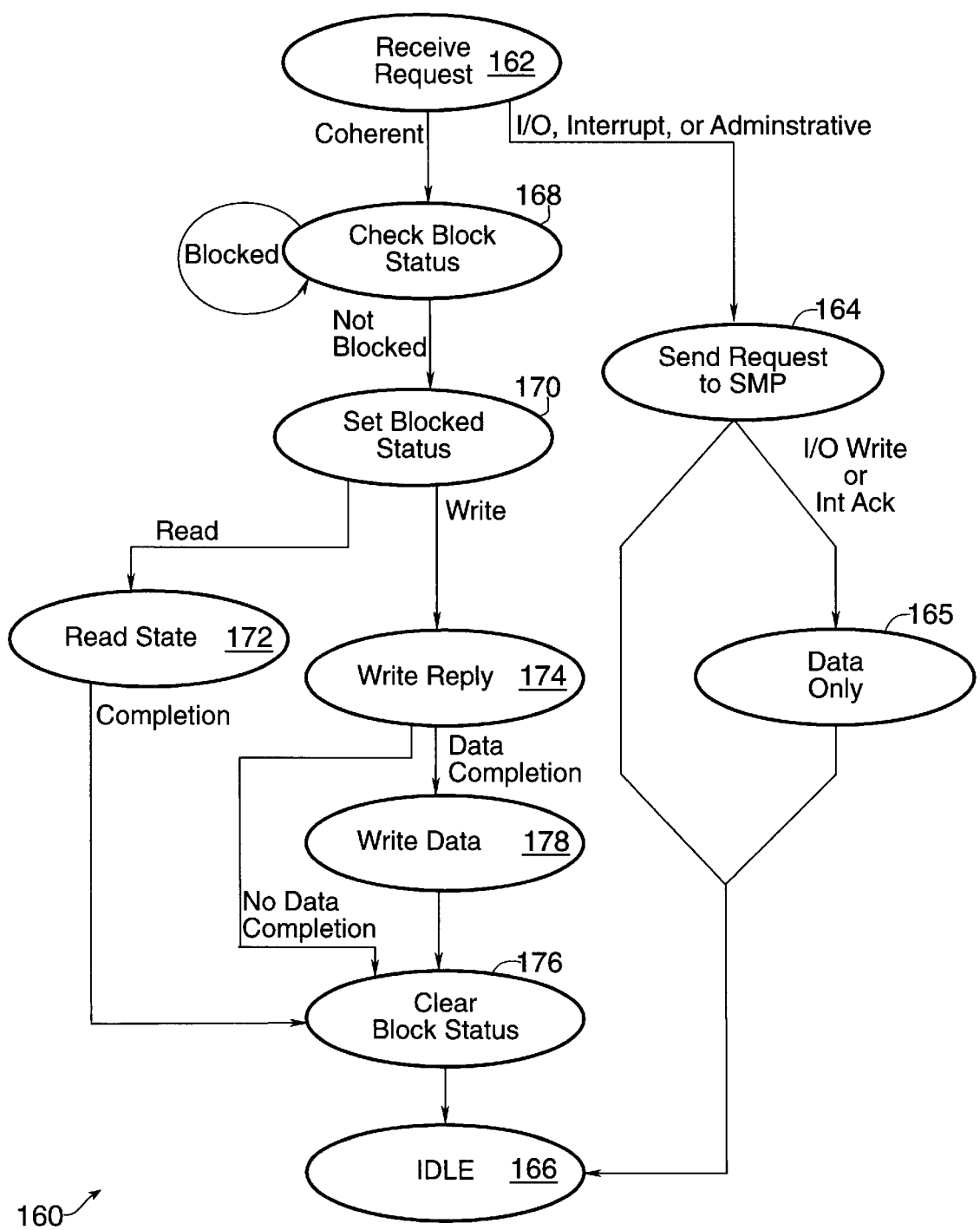
FIG. 7 is a flowchart depicting an exemplary state machine for one embodiment of a home agent shown in FIG. 3.

Turning next to FIG. 7, a flowchart 160 depicting an exemplary state machine for home agent 102 is shown. Home agents 102 may include multiple independent copies of the state machine represented by flowchart 160 in order to allow for processing of multiple outstanding requests to the home agent 102. However, the multiple outstanding requests do not affect the same coherency unit, according to one embodiment.

Home agent 102 receives coherency requests in a receive request state 162. The request may be classified as either a coherent request or an other transaction request. Other transaction requests may include I/O read and I/O write requests, interrupt requests, and administrative requests, according to one embodiment. The non-coherent requests are handled by transmitting a transaction upon SMP bus 20, during a state 164. A coherency completion is subsequently transmitted. Upon receiving the coherency completion, I/O write and accepted interrupt transactions result in transmission of a data transaction upon SMP bus 20 in the home node (i.e. data only state 165). When the data has been transferred, home agent 102 transitions to idle state 166. Alternatively, I/O read, administrative, and rejected interrupted transactions cause a transition to idle state 166 upon receipt of the coherency completion.

Conversely, home agent 102 transitions to a check state 168 upon receipt of a coherent request. Check state 168 is used to detect if coherency activity is in progress for the coherency unit affected by the coherency request. If the coherency activity is in progress (i.e. the coherency information is blocked), then home agent 102 remains in check state 168 until the in-progress coherency activity completes. Home agent 102 subsequently transitions to a set state 170.

During set state 170, home agent 102 sets the status of the directory entry storing the coherency information corresponding to the affected coherency unit to blocked. The blocked status prevents subsequent activity to the affected coherency unit from proceeding, simplifying the coherency protocol of computer system 10. Depending upon the read or write nature of the transaction corresponding to the received coherency request, home agent 102 transitions to read state 172 or write reply state 174.

While in read state 172, home agent 102 issues coherency demands to slave agents 104 which are to be updated with respect to the read transaction. Home agent 102 remains in read state 172 until a coherency completion is received from request agent 100, after which home agent 102 transitions to clear block status state 176. In embodiments in which a coherency request for a read may fail, home agent 102 restores the state of the affected directory entry to the state prior to the coherency request upon receipt of a coherency completion indicating failure of the read transaction.

During write state 174, home agent 102 transmits a coherency reply to request agent 100. Home agent 102 remains in write reply state 174 until a coherency completion is received from request agent 100. If data is received with the coherency completion, home agent 102 transitions to write data state 178. Alternatively, home agent 102 transitions to clear block status state 176 upon receipt of a coherency completion not containing data.

Home agent 102 issues a write transaction upon SMP bus 20 during write data state 178 in order to transfer the received write data. For example, a write stream operation (described below) results in a data transfer of data to home agent 102. Home agent 102 transmits the received data to memory 22 for storage. Subsequently, home agent 102 transitions to clear blocked status state 176.

Home agent 102 clears the blocked status of the coherency information corresponding to the coherency unit affected by the received coherency request in clear block status state 176. The coherency information may be subsequently accessed. The state found within the unblocked coherency information reflects the coherency activity initiated by the previously received coherency request. After clearing the block status of the corresponding coherency information, home agent 102 transitions to idle state 166. From idle state 166, home agent 102 transitions to receive request state 162 upon receipt of a coherency request.

Figure 8:
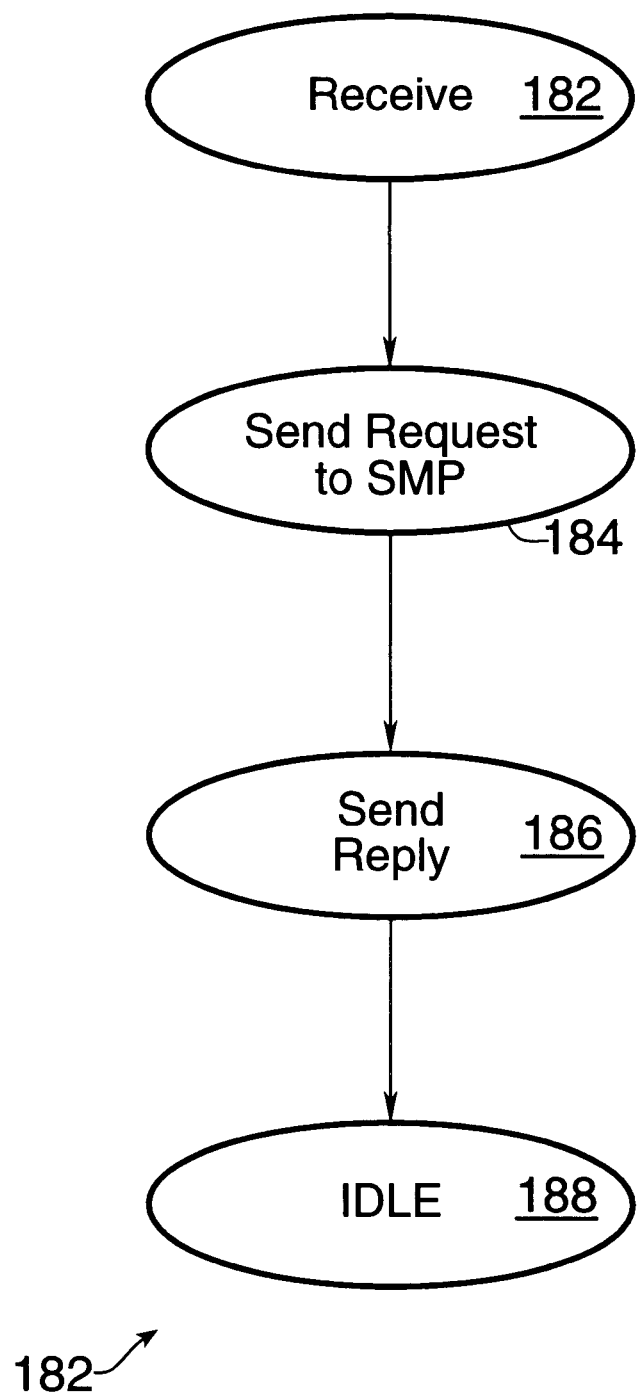
FIG. 8 is a flowchart depicting an exemplary state machine for one embodiment of a slave agent shown in FIG. 3.

Turning now to FIG. 8, a flowchart 180 is shown depicting an exemplary state machine for slave agents 104. Slave agent 104 receives coherency demands during a receive state 182. In response to a coherency demand, slave agent 104 may queue a transaction for presentation upon SMP bus 20. The transaction causes a state change in caches 18 and caches internal to processors 16 in accordance with the received coherency demand. Slave agent 104 queues the transaction during send request state 184.

During send reply state 186, slave agent 104 transmits a coherency reply to the request agent 100 which initiated the transaction. It is noted that, according to various embodiments, slave agent 104 may transition from send request state 184 to send reply state 186 upon queuing the transaction for SMP bus 20 or upon successful completion of the transaction upon SMP bus 20. Subsequent to coherency reply transmittal, slave agent 104 transitions to an idle state 188. From idle state 188, slave agent 104 may transition to receive state 182 upon receipt of a coherency demand.

Turning now to FIGS. 9–12, several tables are shown listing exemplary coherency request types, coherency demand types, coherency reply types, and coherency completion types. The types shown in the tables of FIGS. 9–12 may be employed by one embodiment of computer system 10. Other embodiments may employ other sets of types.

FIG. 9 is a table 190 listing the types of coherency requests. A first column 192 lists a code for each request type, which is used in FIG. 13 below. A second column 194 lists the coherency requests types, and a third column 196 indicates the originator of the coherency request. Similar columns are used in FIGS. 10–12 for coherency demands, coherency replies, and coherency completions. An "R" indicates request agent 100; an "S" indicates slave agent 104; and an "H" indicates home agent 102.

A read to share request is performed when a coherency unit is not present in a particular SMP node and the nature of the transaction from SMP bus 20 to the coherency unit indicates that read access to the coherency unit is desired. For example, a cacheable read transaction may result in a read to share request. Generally speaking, a read to share request is a request for a copy of the coherency unit in the shared state. Similarly, a read to own request is a request for a copy of the coherency unit in the owned state. Copies of the coherency unit in other SMP nodes should be changed to the invalid state. A read to own request may be performed in response to a cache miss of a cacheable write transaction, for example.

Read stream and write stream are requests to read or write an entire coherency unit. These operations are typically used for block copy operations. Processors 16 and caches 18 do not cache data provided in response to a read stream or write stream request. Instead, the coherency unit is provided as data to the processor 16 in the case of a read stream request, or the data is written to the memory 22 in the case of a write stream request. It is noted that read to share, read to own, and read stream requests may be performed as COMA operations (e.g. RTS, RTO, and RS) or as NUMA operations (e.g. RTSN, RTON, and RSN).

A write back request is performed when a coherency unit is to be written to the home node of the coherency unit. The home node replies with permission to write the coherency unit back. The coherency unit is then passed to the home node with the coherency completion.

The invalidate request is performed to cause copies of a coherency unit in other SMP nodes to be invalidated. An exemplary case in which the invalidate request is generated is a write stream transaction to a shared or owned coherency unit. The write stream transaction updates the coherency unit, and therefore copies of the coherency unit in other SMP nodes are invalidated.

I/O read and write requests are transmitted in response to I/O read and write transactions. I/O transactions are non-coherent (i.e. the transactions are not cached and coherency is not maintained for the transactions). I/O block transactions transfer a larger portion of data than normal I/O transactions. In one embodiment, sixty-four bytes of information are transferred in a block I/O operation while eight bytes are transferred in a non-block I/O transaction.

Flush requests cause copies of the coherency unit to be invalidated. Modified copies are returned to the home node. Interrupt requests are used to signal interrupts to a particular device in a remote SMP node. The interrupt may be presented to a particular processor 16, which may execute an interrupt service routine stored at a predefined address in response to the interrupt. Administrative packets are used to send certain types of reset signals between the nodes.

FIG. 10 is a table 198 listing exemplary coherency demand types. Similar to table 190, columns 192, 194, and 196 are included in table 198. A read to share demand is conveyed to the owner of a coherency unit, causing the owner to transmit data to the requesting node. Similarly, read to own and read stream demands cause the owner of the coherency unit to transmit data to the requesting node. Additionally, a read to own demand causes the owner to change the state of the coherency unit in the owner node to invalid. Read stream and read to share demands cause a state change to owned (from modified) in the owner node.

Invalidate demands do not cause the transfer of the corresponding coherency unit. Instead, an invalidate demand causes copies of the coherency unit to be invalidated. Finally, administrative demands are conveyed in response to administrative requests. It is noted that each of the demands are initiated by home agent 102, in response to a request from request agent 100.

FIG. 11 is a table 200 listing exemplary reply types employed by one embodiment of computer system 10. Similar to FIGS. 9 and 10, FIG. 11 includes columns 192, 194, and 196 for the coherency replies.

A data reply is a reply including the requested data. The owner slave agent typically provides the data reply for coherency requests. However, home agents may provide data for I/O read requests.

The acknowledge reply indicates that a coherency demand associated with a particular coherency request is completed. Slave agents typically provide acknowledge replies, but home agents provide acknowledge replies (along with data) when the home node is the owner of the coherency unit.

Slave not owned, address not mapped and error replies are conveyed by slave agent 104 when an error is detected. The slave not owned reply is sent if a slave is identified by home agent 102 as the owner of a coherency unit and the slave no longer owns the coherency unit. The address not mapped reply is sent if the slave receives a demand for which no device upon the corresponding SMP bus 20 claims ownership. Other error conditions detected by the slave agent are indicated via the error reply.

In addition to the error replies available to slave agent 104, home agent 102 may provide error replies. The negative acknowledge (NACK) and negative response (NOPE) are used by home agent 102 to indicate that the corresponding request is does not require service by home agent 102. The NACK transaction may be used to indicate that the corresponding request is rejected by the home node. For example, an interrupt request receives a NACK if the interrupt is rejected by the receiving node. An acknowledge (ACK) is conveyed if the interrupt is accepted by the receiving node. The NOPE transaction is used to indicate that a corresponding flush request was conveyed for a coherency unit which is not stored by the requesting node.

FIG. 12 is a table 202 depicting exemplary coherency completion types according to one embodiment of computer system 10. Similar to FIGS. 9–11, FIG. 12 includes columns 192, 194, and 196 for coherency completions.

A completion without data is used as a signal from request agent 100 to home agent 102 that a particular request is complete. In response, home agent 102 unblocks the corresponding coherency information. Two types of data completions are included, corresponding to dissimilar transactions upon SMP bus 20. One type of reissue transaction involves only a data phase upon SMP bus 20. This reissue transaction may be used for I/O write and interrupt transactions, in one embodiment. The other type of reissue transaction involves both an address and data phase. Coherent writes, such as write stream and write back, may employ the reissue transaction including both address and data phases. Finally, a completion indicating failure is included for read requests which fail to acquire the requested state.

Turning next to FIG. 13, a table 210 is shown depicting coherency activity in response to various transactions upon SMP bus 20. Table 210 depicts transactions which result in requests being transmitted to other SMP nodes 12. Transactions which complete within an SMP node are not shown. A "-" in a column indicates that no activity is performed with respect to that column in the case considered within a particular row. A transaction column 212 is included indicating the transaction received upon SMP bus 20 by request agent 100. MTAG column 214 indicates the state of the MTAG for the coherency unit accessed by the address corresponding to the transaction. The states shown include the MOSI states described above, and an "n" state. The "n" state indicates that the coherency unit is accessed in NUMA mode for the SMP node in which the transaction is initiated. Therefore, no local copy of the coherency unit is stored in the requesting nodes memory. Instead, the coherency unit is transferred from the home SMP node (or an owner node) and is transmitted to the requesting processor 16 or cache 18 without storage in memory 22.

A request column 216 lists the coherency request transmitted to the home agent identified by the address of the transaction. Upon receipt of the coherency request listed in column 216, home agent 102 checks the state of the coherency unit for the requesting node as recorded in directory 66. D column 218 lists the current state of the coherency unit recorded for the requesting node, and D' column 220 lists the state of the coherency unit recorded for the requesting node as updated by home agent 102 in response to the received coherency request. Additionally, home agent 102 may generate a first coherency demand to the owner of the coherency unit and additional coherency demands to any nodes maintaining shared copies of the coherency unit. The coherency demand transmitted to the owner is shown in column 222, while the coherency demand transmitted to the sharing nodes is shown in column 224. Still further, home agent 102 may transmit a coherency reply to the requesting node. Home agent replies are shown in column 226.

The slave agent 104 in the SMP node indicated as the owner of the coherency unit transmits a coherency reply as shown in column 228. Slave agents 104 in nodes indicated as sharing nodes respond to the coherency demands shown in column 224 with the coherency replies shown in column 230, subsequent to performing state changes indicated by the received coherency demand.

Upon receipt of the appropriate number of coherency replies, request agent 100 transmits a coherency completion to home agent 102. The coherency completions used for various transactions are shown in column 232.

As an example, a row 234 depicts the coherency activity in response to a read to share transaction upon SMP bus 20 for which the corresponding MTAG state is invalid. The corresponding request agent 100 transmits a read to share coherency request to the home node identified by the global address associated with the read to share transaction. For the case shown in row 234, the directory of the home node indicates that the requesting node is storing the data in the invalid state. The state in the directory of the home node for the requesting node is updated to shared, and read to share coherency demand is transmitted by home agent 102 to the node indicated by the directory to be the owner. No demands are transmitted to sharers, since the transaction seeks to acquire the shared state. The slave agent 104 in the owner node transmits the data corresponding to the coherency unit to the requesting node. Upon receipt of the data, the request agent 100 within the requesting node transmits a coherency completion to the home agent 102 within the home node. The transaction is therefore complete.

It is noted that the state shown in D column 218 may not match the state in MTAG column 214. For example, a row 236 shows a coherency unit in the invalid state in MTAG column 214. However, the corresponding state in D column 218 may be modified, owned, or shared. Such situations occur when a prior coherency request from the requesting node for the coherency unit is outstanding within computer system 10 when the access to MTAG 68 for the current transaction to the coherency unit is performed upon address bus 58. However, due to the blocking of directory entries during a particular access, the outstanding request is completed prior to access of directory 66 by the current request. For this reason, the generated coherency demands are dependent upon the directory state (which matches the MTAG state at the time the directory is accessed). For the example shown in row 236, since the directory indicates that the coherency unit now resides in the requesting node, the read to share request may be completed by simply reissuing the read transaction upon SMP bus 20 in the requesting node. Therefore, the home node acknowledges the request, including a reply count of one, and the requesting node may subsequently reissue the read transaction. It is further noted that, although table 210 lists many types of transactions, additional transactions may be employed according to various embodiments of computer system 10.

Synchronization

Figure 14:
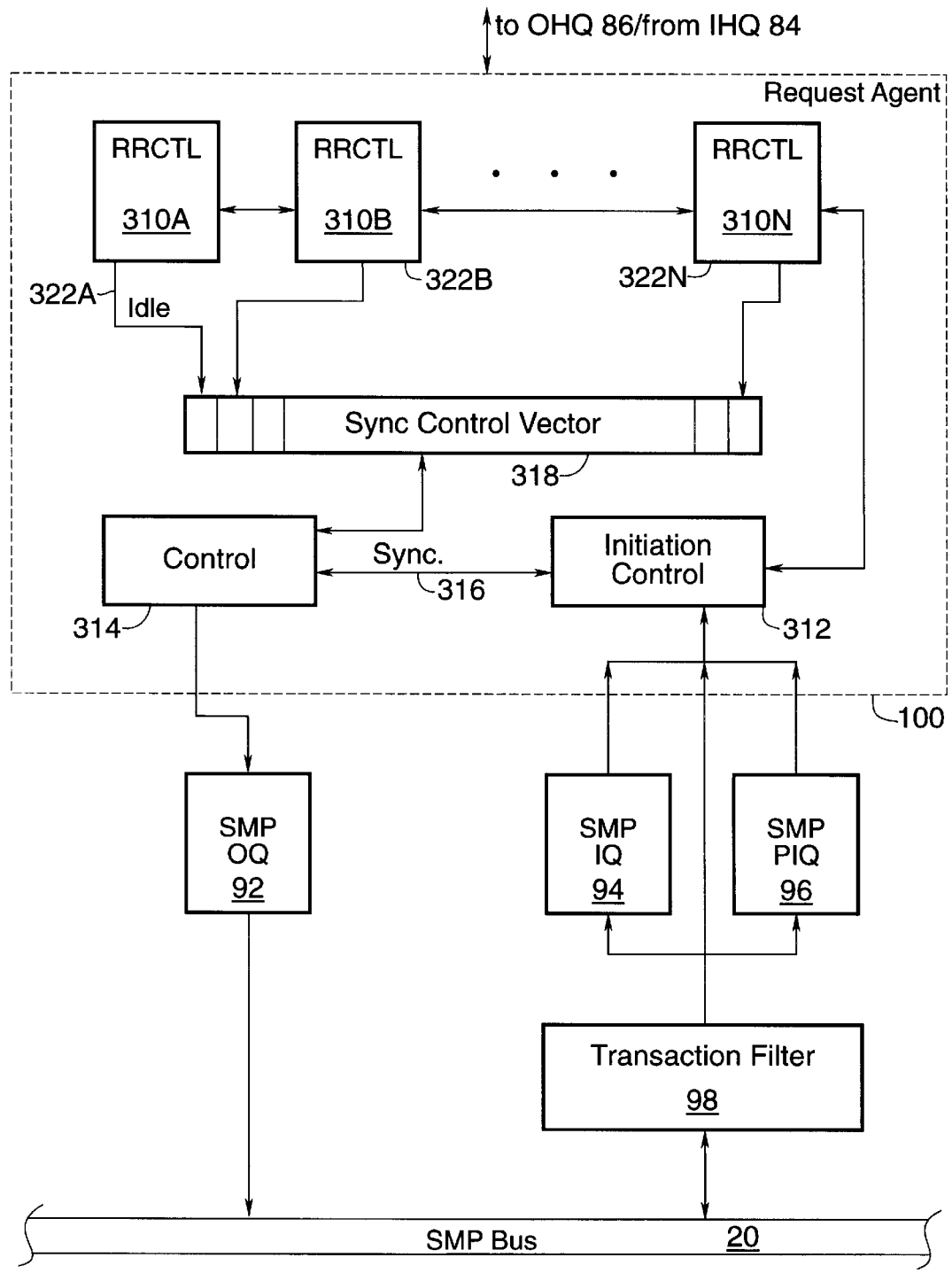
FIG. 14 is a block diagram of one embodiment of a portion of a system interface shown in FIG. 1.

Turning next to FIG. 14, a block diagram of a portion of one embodiment of system interface 24 is shown. Request agent 100 is shown in greater detail. Additionally, SMP in queue 94, SMP PIQ 96, SMP out queue 92, and transaction filter 98 are shown. Transaction filter 98 is coupled to SMP bus 20, SMP in queue 94, SMP PIQ 96, and request agent 100. SMP out queue 92, SMP in queue 94, and SMP PIQ 96 are coupled to request agent 100 as well.

Each transaction presented upon SMP bus 20 for which ignore signal 70 is asserted is stored by system interface 24 for later reissue. As mentioned above, ignore signal 70 may be asserted if the access rights for the affected coherency unit do not allow the transaction to complete locally. Additionally, ignore signal 70 may be asserted if a prior transaction from the same subnode 50 is pending within system interface 24. Still further, ignore signal 70 may be asserted for other reasons (such as full in queues, etc.).

Request agent 100 comprises multiple independent control units 310A–310N. Each control unit 310 comprises a state machine employing the flowchart shown in FIG. 6. A control unit 310A–310N may initiate coherency activity (e.g. perform a coherency request) for a particular transaction from SMP in queue 94 or SMP PIQ 96, and may determine when the coherency activity completes via receiving replies. An initiation control unit 312 selects transactions from SMP in queue 94 and SMP PIQ 96 for service by a control unit 310A–310N. Any selection criteria may be employed as long as neither SMP in queue 94 nor SMP PIQ 96 are unconditionally prioritized higher than the other and as long as at least one control unit 310A–310N is not allocated to performing I/O operations.

In addition to selecting transactions for service by control units 310, initiation control unit 312 informs a second control unit 314 that a synchronization operation has been selected for initiation. A sync signal upon a sync line 316 coupled between initiation control unit 312 and control unit 314 is asserted when a synchronization operation is selected from either SMP in queue 94 or SMP PIQ 96. Control unit 314 manages a synchronization vector control register 318, and reissues the synchronization operation to SMP out queue 92 upon completion of the synchronization operation.

Upon receipt of an asserted sync signal upon sync line 316, control unit 314 causes control register 318 to record which control units 310 are currently performing coherency activities (i.e. those control units 310 which are not idle). In one embodiment, control register 318 includes multiple bits.

Each bit corresponds to one of control units 310. If the bit is set, the corresponding control unit 310A–310N is performing coherency activity which was initiated prior to control unit 314 initiating a synchronization operation. If the bit is clear, the corresponding control unit 310A–310N is either idle or performing coherency activity which was initiated subsequent to control unit 314 initiating a synchronization operation. Each control unit 310 provides an idle line (e.g. idle line 322A from control unit 310A) to control register 318. When the idle signal upon an idle line 322 is asserted, the bit corresponding to the idle control unit 310 within control register 318 is cleared.

Control unit 314 monitors the state of control register 318. When each of the bits have been reset, each of control units 310 have been idle at least once. Therefore, coherency activity which was outstanding upon initiation of the synchronization operation has completed. Particularly, the transactions corresponding to the coherency activity have been globally performed. Therefore, the synchronization operation is complete. Control unit 314 reissues the synchronization operation to SMP out queue 92, and subsequently the reissue transaction completes within the SMP node. More particularly, the synchronization transaction is cleared from the initiating processor. The initiating processor may therefore determine when the synchronization operation has completed (by inserting a processor level synchronization subsequent to the synchronization operation, for example). Exemplary code sequences employing the synchronization operation are shown below.

In one embodiment, the synchronization operation is placed into SMP in queue 94 upon performance of the synchronization operation upon SMP bus 20 (similar to other transactions). Additionally, ignore signal 70 is asserted for the synchronization operation upon SMP bus 20.

It is noted that request agent 100 is configured to accept only one synchronization operation at a time in the present embodiment. Furthermore, two types of synchronization operations are defined: a coherent synchronization and I/O synchronization. Coherent synchronizations synchronize transactions placed in SMP in queue 94 Alternatively, I/O synchronizations synchronize I/O transactions (i.e. transactions placed in SMP PIQ 96).

Additionally, control units 310 may further employ a freeze state for use when errors are detected. If an error is detected for a transaction being serviced by a control unit 310, the control unit transitions to a freeze state and remains therein until released by a software update to a control register. In this manner, information regarding the transaction for which the error is detected (stored by the state machine) may be accessed to aid in determining the error. For purposes of allowing synchronization operations to complete, entering the freeze state is equivalent to entering the idle state.

Figure 15:
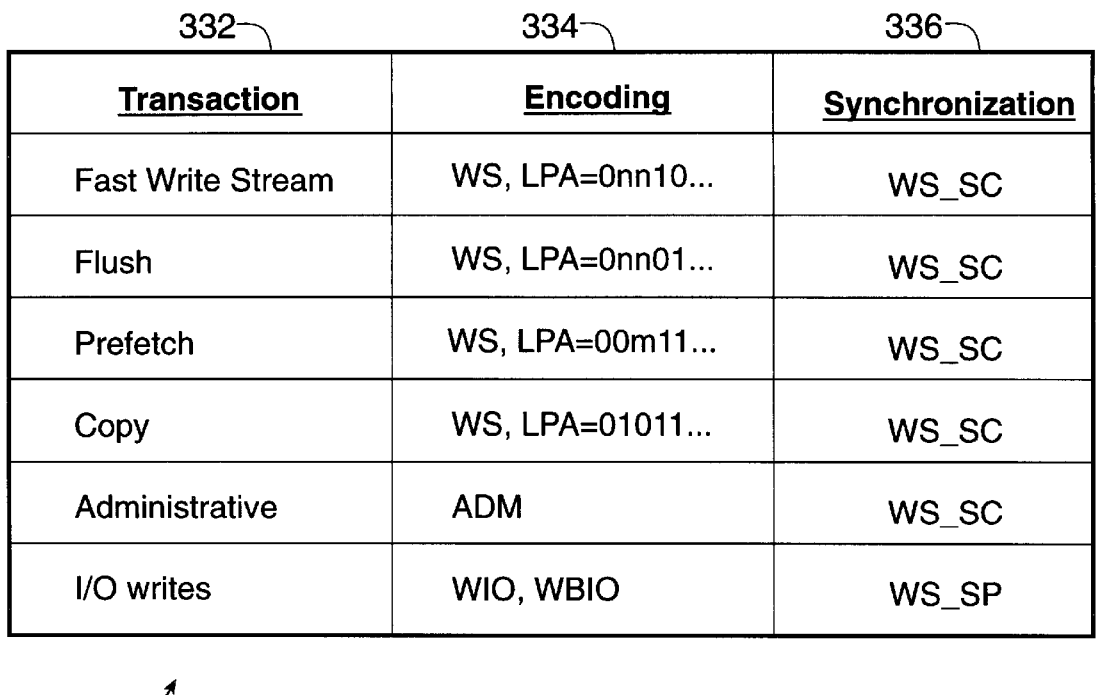
FIG. 15 is a table depicting asynchronous operations employed by one embodiment of the computer system shown in FIG. 1, along with a synchronization operation used to synchronize the asynchronous operations.

Turning next to FIG. 15, a table 330 is shown listing exemplary asynchronous operations according to one embodiment of computer system 10. A column 332 lists the asynchronous transaction A column 334 lists the encoding of the transaction upon SMP bus 20. Finally, a column 336 lists the synchronization operation which is used to synchronize the particular asynchronous operations.

The fast write stream asynchronous operation is employed to enhance the performance characteristics of writes to remote nodes. When a fast write stream operation is performed, system interface 24 allows the initiating processor to transfer the data thereto prior to performing coherency activities which may be required to obtain write permission to the affected coherency unit. In this manner, the processor resources consumed by the fast write stream operation may be freed more rapidly than otherwise achievable. As shown in column 334, the fast write stream operation is coded as a write stream having the five most significant bits of the address coded as shown. The "nn" identifies the home node of the address. The coherent synchronization operation ("WS_SC") is used to synchronize the fast write stream operation.

A second asynchronous operation employed in the exemplary embodiment is the flush operation. When a flush operation is detected by system interface 24, the affected coherency unit (if stored in the SMP node) is flushed. In other words, the coherency unit is stored back to the home node and the MTAG for the coherency unit is set to invalid. In the exemplary embodiment, the flush operation is coded as a write stream operation having the five most significant bits of the address coded as shown in column 334. The flush command uses a write stream encoding, although the data corresponding to the write stream is discarded. Similar to the fast write stream, system interface 24 allows the data to be transferred prior to global performance of the flush operation. The flush operation is synchronized using WS_SC.

Yet another asynchronous operation is the software prefetch operation. The software prefetch operation is used to transfer a coherency unit into the local SMP node 12A–12D prior to performance of an operation which actually accesses the operation. Performance of the computer system may be increased by performing any necessary coherency activities and fetching the coherency unit prior to actual use by a program executing within the node. The prefetch operation is coded as a write stream operation having the most significant five bits coded as shown in column 334. The "m" bit indicates the mode of the prefetch: either shared or modified. If a coherency unit is prefetched with the intention to update the coherency unit, it may be prefetched in modified state. On the other hand, a coherency unit may be prefetched simply for read access. Such a prefetch may be performed in the shared state. Similar to the flush operation, data provided by the processor for the prefetch operation is discarded and the data may be transferred prior to completion of the corresponding coherency activity. The WS_SC synchronization command is used to synchronize prefetch activities.

A copy asynchronous operation is implemented in order to enhance the throughput of block copy operations from a source block to a destination block. The destination block is identified by the local physical address of the copy operation, and the source block is identified by the global address corresponding thereto. Upon detection of the copy operation, system interface 24 transfers the source block to the local node. The copy operation is coded as a write stream operation having the most significant five bits of the address as shown in column 334. Similar to the prefetch and flush operations, data transmitted by the processor for the write stream operation is discarded. Copy operations are synchronized using the WS_SC operation. Administrative operations are asynchronous as well, and are synchronized using the WS_SC operation.

Finally, remote I/O write operations are performed asynchronously, in that the corresponding data is transferred from the initiating processor prior to initiation of I/O activity in response to the I/O write operation upon network 14. The I/O write operations are synchronized using the I/O synchronization operation ("WS_SP").

The synchronization operations in the exemplary embodiment are coded as write stream operations as well, although any encoding which conveys the synchronization command upon SMP bus 20 may be used. In particular for the exemplary embodiment, the WS_SC operation is coded as a write stream operation for which the seven most significant address bits are coded as 0111100 (in binary). The WS_SP operation is coded as a write stream operation for which the seven most significant address bits are coded as 0111101 (in binary). An alternative embodiment may employ a specially coded I/O read operation to perform synchronization. When the I/O read operation is detected, previously received transactions are completed prior to returning data for the I/O read operation.

Figure 16:
FIG. 16 is an exemplary code sequence using one of the synchronization operations shown in FIG. 15.

Turning now to FIG. 16, an exemplary code sequence 340 is shown depicting use of synchronization operations. The example includes instructions from the SPARC microprocessor architecture. The order of operations in the program (the "program order") is indicated by arrow 342. In the example, several fast write stream operations are performed (the "WS_FW" operations shown in FIG. 16). Upon completion of a series of fast write stream operations, the code sequence includes a WS_SC operation to synchronize the completion of the operations. Additionally, a MEMBAR instruction is included to guarantee completion of the WS_SC operation prior to initiation of any memory operations subsequent to the MEMBAR instruction.

Generally, the WS_SC operation is an example of a system level synchronization operation. The WS_SC operation causes a synchronization to occur in the system interface 24 of the SMP node 12A–12D within which the WS_SC operation is executed. In this manner, the node is synchronized. However, synchronizing the processor itself is performed using a processor level synchronization operation. The processor level synchronization operation does not synchronize the node, but does synchronize the processor 16 within which it is executed. By pairing a system level synchronization in the manner of FIG. 16, a complete synchronization of each level of the computer system may be achieved.

Figure 17:
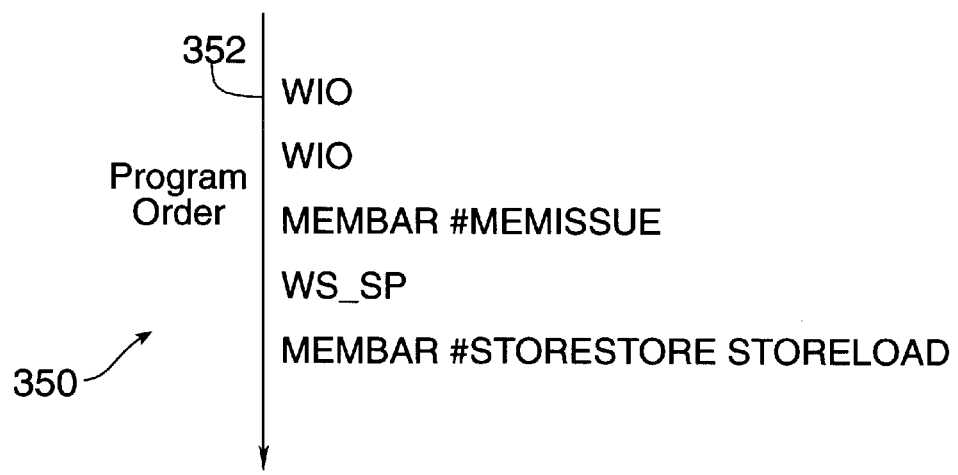
FIG. 17 is an exemplary code sequence using another one of the synchronization operations shown in FIG. 15.

FIG. 17 depicts an exemplary code sequence 350 indicating use of the WS_SP operation with I/O write operations. The program order of the instructions is indicated by arrow 352. Similar to code sequence 340, code sequence 350 includes a system level synchronization operation and a processor level synchronization operation. Additionally, code sequence 350 includes a processor level synchronization operation prior to the system level synchronization operation. The prior processor level synchronization operation ensures that the I/O write operations are performed to SMP bus 20 prior to the system level synchronization operation. The prior processor level synchronization operation is used because the embodiment depicted in the example uses a specially coded write stream operation to a normal (i.e. non-I/O) address. The SPARC architecture does not require I/O and normal transactions to be ordered. Therefore, processor level synchronization is required both prior to and subsequent to the system level synchronization in the example shown in FIG. 17.

Although SMP nodes 12 have been described in the above exemplary embodiments, generally speaking an embodiment of computer system 10 may include one or more processing nodes. As used herein, a processing node includes at least one processor and a corresponding memory. Additionally, circuitry for communicating with other processing nodes is included. When more than one processing node is included in an embodiment of computer system 10, the corresponding memories within the processing nodes form a distributed shared memory. A processing node may be referred to as remote or local. A processing node is a remote processing node with respect to a particular processor if the processing node does not include the particular processor. Conversely, the processing node which includes the particular processor is that particular processor's local processing node.

In accordance with the above disclosure, a synchronization method and apparatus for a distributed shared memory computer system has been described. Advantageously, asynchronous operations may be employed by the computer system and the completion thereof may be verified when desired via the synchronization operation. Performance of the computer system may be enhanced via the more efficient operation of the asynchronous operations, and correct operation of a particular program may be achieved via the synchronization operations.

Numerous variations and modifications will become apparent to those skilled in the art once the above disclosure is fully appreciated. For example, although various blocks and components shown herein have been described in terms of hardware embodiments, alternative embodiments may implement all or a portion of the hardware functionality in software. It is intended that the following claims be interpreted to embrace all such variations and modifications.

What is claimed is:

1. A processing node comprising:
   a processor configured to perform a synchronization command; and
   a request agent coupled to receive said synchronization command from said processor, wherein said request agent is configured to perform a synchronization operation upon receipt of said synchronization command, wherein said request agent comprises a plurality of control units, and wherein each of said plurality of control units is configured to initiate coherency activity with respect to a transaction, and wherein said plurality of control units are configured to operate upon different transactions in parallel.

2. The processing node as recited in claim 1 wherein said synchronization command comprises a write operation to a predefined address.

3. The processing node as recited in claim 1 wherein each of said plurality of control units are configured to convey a coherency request and to receive one or more coherency replies with respect to said transaction.

4. The processing node as recited in claim 1 wherein said request agent performs said synchronization by determining that each of said plurality of control units has entered an idle state at least once subsequent to receipt of said write transaction.

5. The processing node as recited in claim 4 wherein said request agent further comprises a synchronization control vector register, wherein said synchronization control vector register includes a bit corresponding to one of said plurality of control units, and wherein said bit is set upon receipt of said write transaction if said one of said plurality of control units is performing coherency activity.

6. The processing node as recited in claim 5 wherein said one of said plurality of control units is configured to indicate that said one of said plurality of control units is entering said idle state, and wherein said bit is cleared upon indication by said one of said plurality of control units that said one of said plurality of control units is entering said idle state.

7. The processing node as recited in claim 1 wherein said request agent further comprises a queue, wherein said request agent is configured to initiate said synchronization upon arrival of said write transaction at a head of said queue.

8. The processing node as recited in claim 7 further comprising a second control unit configured to reissue said write transaction upon completion of said synchronization.

9. The processing node as recited in claim 7 wherein said queue comprises a first transaction queue for storing coherent transactions and a second transaction queue for storing input/output transactions.

10. The processing node as recited in claim 9 wherein said synchronization is performed for coherent transactions if said specific predefined address comprises a first specific predefined address, and wherein said write operation is inserted into said first transaction queue upon receipt from said processor.

11. The processing node as recited in claim 10 wherein said synchronization is performed for input/output transactions if said specific predefined address comprises a second specific predefined address, and wherein said write operation is inserted into said second transaction queue upon receipt from said processor.

12. A computer system comprising:
a first processing node including a request agent and at least one processor, wherein said request agent is configured to perform coherency requests in response to transactions performed by said processor; and
a second processing node including a slave agent configured to perform coherency replies in response to said coherency requests;
wherein said request agent is configured to inhibit additional coherency requests in response to transactions performed by said processor until said coherency replies are received for coherency requests outstanding from said request agent upon receipt of a synchronization operation performed within said first processing node.

13. A method for performing synchronization comprising:
executing a synchronization operation in a processor within a processing node;
receiving said synchronization operation in a request agent within said processing node;
waiting for coherency activity initiated by said request agent prior to said receiving to complete; and
reissuing said synchronization operation within said processing node, whereby said synchronization operation is completed.

14. The method as recited in claim 13 wherein said synchronization operation comprises a write transaction having a specific predefined address.

15. The method as recited in claim 14 wherein said write transaction comprises a write stream transaction.

16. The method as recited in claim 13 wherein said request agent comprises a synchronization control vector register having a bit corresponding to one a plurality of control units within said request agent which are configured to concurrently initiate coherency activity.

17. The method as recited in claim 16 wherein said waiting comprises clearing said bit when said one of said plurality of control units enters an idle state.

18. The method as recited in claim 16 wherein said request agent further comprises a queue.

19. The method as recited in claim 18 wherein said waiting is initiated upon arrival of said synchronization operation at a head of said queue.

20. A method for synchronizing comprising:
executing at least one asynchronous operation;
executing a system level synchronizing operation subsequent to said asynchronous operation; and
executing a processor level synchronization operation subsequent to said system level synchronization operation.

* * * * *